United States Patent
Siver et al.

(10) Patent No.: US 10,779,005 B2
(45) Date of Patent: Sep. 15, 2020

(54) SYSTEM AND METHOD FOR IMAGE PROCESSING

(71) Applicant: BLINXEL PTY LTD, Victoria (AU)

(72) Inventors: Glen Siver, Victoria (AU); David Gregory Jones, Medway, MA (US)

(73) Assignee: BLINXEL PTY LTD, Victoria (AU)

( * ) Notice: Subject to any disclaimer, the term of this patent is extended or adjusted under 35 U.S.C. 154(b) by 26 days.

(21) Appl. No.: 15/744,581

(22) PCT Filed: Jul. 15, 2016

(86) PCT No.: PCT/AU2016/050625
§ 371 (c)(1),
(2) Date: Jan. 12, 2018

(87) PCT Pub. No.: WO2017/008125
PCT Pub. Date: Jan. 19, 2017

(65) Prior Publication Data
US 2018/0213255 A1 Jul. 26, 2018

(30) Foreign Application Priority Data

Jul. 15, 2015 (AU) .............................. 2015902803

(51) Int. Cl.
*G06K 9/00* (2006.01)
*H04N 19/597* (2014.01)
(Continued)

(52) U.S. Cl.
CPC ......... *H04N 19/597* (2014.11); *H04N 13/139* (2018.05); *H04N 13/15* (2018.05);
(Continued)

(58) Field of Classification Search
None
See application file for complete search history.

(56) References Cited

U.S. PATENT DOCUMENTS 7,119,813 B1 * 10/2006 Hollis ................... G06T 11/001
345/605
2011/0206124 A1 * 8/2011 Morphet ................ H04N 5/145
375/240.16
(Continued)

FOREIGN PATENT DOCUMENTS

EP 2392144 A1 12/2011
EP 2858359 A1 4/2015
(Continued)

OTHER PUBLICATIONS

PCT Search Report for corresponding International Appication No. PCT/AU2016/050625 dated Sep. 16, 2016, 6 pages.
(Continued)

*Primary Examiner* — Hadi Akhavannik
(74) *Attorney, Agent, or Firm* — Lee & Hayes, P.C.

(57) ABSTRACT

Some embodiments relate to a machine-implemented method of packing volumetric image data executed by at least one processing device, the method comprising: determining a first block size; writing to memory a first block of image data from a first image, the first block having the first block size; determining a second block size; and writing to memory a second block of image data from a second image, the second block having the second block size; wherein the first image contains X by Y pixels of one of colour data and depth data, and the second image contains X by Y pixels of the other of colour and depth data; and wherein the first image is related to the second image. Embodiments also relate to methods of unpacking volumetric image data. Further embodiments relate to systems and computer-readable media storing or having access to code to execute the packing and unpacking methods.

18 Claims, 16 Drawing Sheets

3100

(51) Int. Cl.
    *H04N 13/139*     (2018.01)
    *H04N 19/88*     (2014.01)
    *H04N 13/189*     (2018.01)
    *H04N 13/15*     (2018.01)
    *H04N 13/161*     (2018.01)
    *H04N 21/81*     (2011.01)
    *H04N 21/854*     (2011.01)

(52) U.S. Cl.
    CPC ......... *H04N 13/161* (2018.05); *H04N 13/189* (2018.05); *H04N 19/88* (2014.11); *H04N 21/816* (2013.01); *H04N 21/85406* (2013.01); *H04N 2213/003* (2013.01)

(56) References Cited

U.S. PATENT DOCUMENTS

| | | | | |
|---|---|---|---|---|
| 2013/0135435 A1* | 5/2013 | D'Amato | ............. | H04N 13/183 348/43 |
| 2014/0254954 A1 | 9/2014 | Thakkar et al. | | |
| 2014/0368610 A1* | 12/2014 | Grangetto | .......... | H04N 1/32309 348/43 |
| 2015/0117534 A1* | 4/2015 | Kim | .................... | H04N 19/521 375/240.15 |
| 2015/0215599 A1* | 7/2015 | D'Amato | ............. | H04N 13/178 348/42 |
| 2016/0065982 A1* | 3/2016 | Cho | .................... | H04N 19/503 375/240.12 |
| 2018/0213255 A1* | 7/2018 | Siver | .................... | H04N 21/816 |

FOREIGN PATENT DOCUMENTS

| | | |
|---|---|---|
| WO | WO2013188552 | 12/2013 |
| WO | WO2014037822 | 3/2014 |

OTHER PUBLICATIONS

PCT Written Opinion for corresponding International Appication No. PCT/AU2016/050625 dated Sep. 16, 2016, 5 pages.

EP Examination Report for corresponding EP Patent Application No. 16823566.1 dated Jan. 22, 2019, 9 pages.

EP Examination Report for corresponding EP Patent Application No. 16823566.1 dated Mar. 16, 2020, 6 pages.

* cited by examiner

SYSTEM AND METHOD FOR IMAGE PROCESSING

This Application is a 371 national phase application of international application number PCT/AU2016/050625 filed 15 Jul. 2016, which claims priority to AU 2015902803 filed 15 Jul. 2015, which are incorporated herein by reference.

TECHNICAL FIELD

The invention relates generally to methods, devices and systems for packing and unpacking image and video data containing depth information. In particular, described embodiments are directed to methods, devices and systems for packing depth information alongside colour information using image and video containers, and to methods, devices and systems for unpacking the colour and depth information.

BACKGROUND

In image processing, container formats are used to set out how data is to be stored within a file. Existing image, sequence, and video containers are configured to store data so that it can be retrieved and displayed as accurately as possible, while also keeping the file size as small as possible. This balance between fidelity and data compression is handled in different ways by different image and video containers, with some containers being configured for high fidelity to allow for a higher quality of data reproduction, and others being configured to allow for smaller file sizes through data compression.

The quality of image and video containers are generally judged using psychovisual heuristics and evaluations as primary criterion, by estimating how closely a reconstructed image or video resembles the source data from the point of view of a human viewer. In the interest of performance and bandwidth, containers that have widespread deployment are typically optimized for visual structural similarity (SSIM) as opposed to strictly numerical signal accuracy. In other words, the quality of the data stored within the container is judged based on how similar the resulting image or video looks to a human viewer, rather than how similar it is to the source data numerically. While image containers and video containers are well established for storing images and image sequence files containing visual colour data, containers that have been designed for visual colour information are not well suited to storing non-colour data.

It is desired to address or ameliorate one or more shortcomings or disadvantages associated with prior systems for the packing and unpacking of image and video data, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a machine-implemented method of packing volumetric image data executed by at least one processing device, the method comprising:

determining a first block size;
writing to memory a first block of image data from a first image, the first block having the first block size;
determining a second block size; and
writing to memory a second block of image data from a second image, the second block having the second block size;
wherein the first image contains X by Y pixels of one of colour data and depth data, and the second image contains X by Y pixels of the other of colour and depth data; and
wherein the first image is related to the second image.

The method may comprise unifying the first image with the second image, to correlate the colour data with the depth data. The method may comprise setting bounds of the image container based on a size of the first image and a size of the second image. The image container may be sized to store around X by Y pixels of colour data and around X by Y pixels of depth data.

The volumetric image data may be packed into a predefined image container. A data format of the image container may be configured for colour data storage. The image container may be configured to store between 1 and 40 components of colour data.

The image container may be configured to store colour data and auxiliary data. The image container may configured to store between 1 and 40 components of colour data and 1 to 40 components of auxiliary data. The depth data may be stored within one or more auxiliary components of the container.

At least one of the first block size and the second block size may be determined based on metadata associated with the first image or the second image. At least one of the first block size and the second block size may be determined based on data stored in a file, the file being associated with the first image or the second image.

At least one of the first block size and the second block size are determined based on the size of the first image or the second image. The first block size and the second block size may each be the image size X by Y. The first block size and the second block size may each be the image width X. The first block size and the second block size may each be smaller than X by Y.

The first block size and the second block size may each be a single pixel. The first block size and the second block size may each be a multiple of 8 pixels. The first block size and the second block size may each be 8 pixels. The first block size and the second block size may each be 16 pixels. The first block size and the second block size may each be 32 pixels. The first block size and the second block size may each be 64 pixels.

The first image may be temporally related to the second image. The first image may be spatially related to the second image.

One or more of the colour data and the depth data may be split into one or more data components before being written to memory. The method may further comprise scaling at least one data component in size before writing it to memory.

The first block of data may comprise one or more of the data components of one of the colour data and the depth data, and the second block may comprise one or more of the data components of the other of the colour data and the depth data.

The data components may be packed into a grid configuration when being written to memory.

The colour and depth data may be split into five data components, and the data components may be packed into a square configuration when being written to memory.

The square configuration may have nine segments, the segments being separated by lines drawn from each vertex of the square, to the midpoint of the second side of the square counting counter-clockwise from the vertex, such that combining a matching pair of segments produces a square of equal size to the central square, a matching pair of segments being a first segment touching any apex of a central segment with a second segment touching the second wall of the central segment counting the walls clockwise from the apex of the central segment. One data component may be packed into the central square, and the remaining four data components may each be packed into a pair of matching segments.

The method may further comprise repeating the method until all of the image data from the first and second images has been written to memory.

The first image may belong to a first series of images forming one of a colour image sequence and a depth image sequence, and the second image may belong to a second series of images forming the other of a colour image sequence and a depth image sequence, and the colour image sequence may be related to the depth image sequence. The colour image sequence may be temporally related to the depth image sequence. The colour image sequence may be spatially related to the depth image sequence.

The method may further comprise taking images sequentially from the first series of images and the second series of images, and repeating the method until all of the images have been written to memory.

The method may further comprise retrieving at least one of the first image and the second image from a memory location. The method may further comprise receiving at least one of the first image and the second image from a recording device. The method may further comprise receiving at least one of the first image and the second image from an external device.

The method may comprise reprojecting the first image and the second image into a unified space. The method may comprise spatially correlating the first image with the second image.

Some embodiments relate to a machine implemented method of unpacking volumetric image data executed by at least one processing device, the method comprising:
  determining a first block size;
  reading a first block of data from a first location in memory, the first block of data comprising one of colour data and depth data, and the first block having the first block size;
  determining a second block size; and
  reading a second block of data from a second location in memory, the second block of data comprising the other of colour data and depth data, and the second block having the second block size;
  wherein the colour data is related to the depth data.

The colour data may be spatially correlated with the depth data. The first block of data may be written to a first image file and the second block of data may be written to a second image file. The method may comprise setting bounds of a first image file size and a second image file size based on a size of the volumetric image file.

The first block of data and the second block of data may be part of a volumetric image file. At least one of the first block size and the second block size may be determined based on metadata associated with the volumetric image file.

At least one of the first block size and the second block size may be determined based on data stored in a file, the file being associated with the volumetric image file.

At least one of the first block size and the second block size may be determined based on the size of the volumetric image file. The first block size and the second block size may each be half of the volumetric image size. The first block size and the second block size may each be the volumetric image width. The first block size and the second block size may each be smaller than half of the volumetric image size.

The first block size and the second block size may each be a single pixel. The first block size and the second block size may each be a multiple of 8 pixels. The first block size and the second block size may each be 8 pixels. The first block size and the second block size may each be 16 pixels. The first block size and the second block size may each be 32 pixels. The first block size and the second block size may each be 64 pixels.

At least one of the first block and the second block may be scaled in size after being read.

The method may further comprise repeating the method until all of the data from volumetric image file has been read from memory.

The volumetric image file may belong to a series of volumetric images. The method may further comprise taking images sequentially from the series of volumetric images, and repeating the method until all of the images have been read to memory.

The method may further comprise displaying the read data on a visual display.

The colour data and the depth data may be reprojected into a unified image space.

The volumetric image data may have been packed according to the method according to some other embodiments.

Some embodiments relate to computer-readable medium storing executable program code that, when executed by a computing device or computing system, causes the computing device or computing system to perform the method according to some other embodiments.

Some embodiments relate to a system comprising:
  at least one processor; and
  memory;
  wherein the at least one processor has access to the memory and the memory comprises the computer-readable medium of some other embodiments.

The system may further comprise a recording device configured to capture image and depth data.

Some embodiments relate to a system comprising means for performing the method of any one of some other embodiments.

BRIEF DESCRIPTION OF DRAWINGS

Embodiments are described in further detail below, by way of example and with reference to the accompanying drawings, in which.

DETAILED DESCRIPTION

Embodiments relate generally to methods, devices and systems for packing and unpacking image and video data containing depth information. In particular, described embodiments are directed to methods, devices and systems for packing depth information alongside colour information using existing image and video containers, and to methods, devices and systems for unpacking the colour and depth information.

Figure 1:
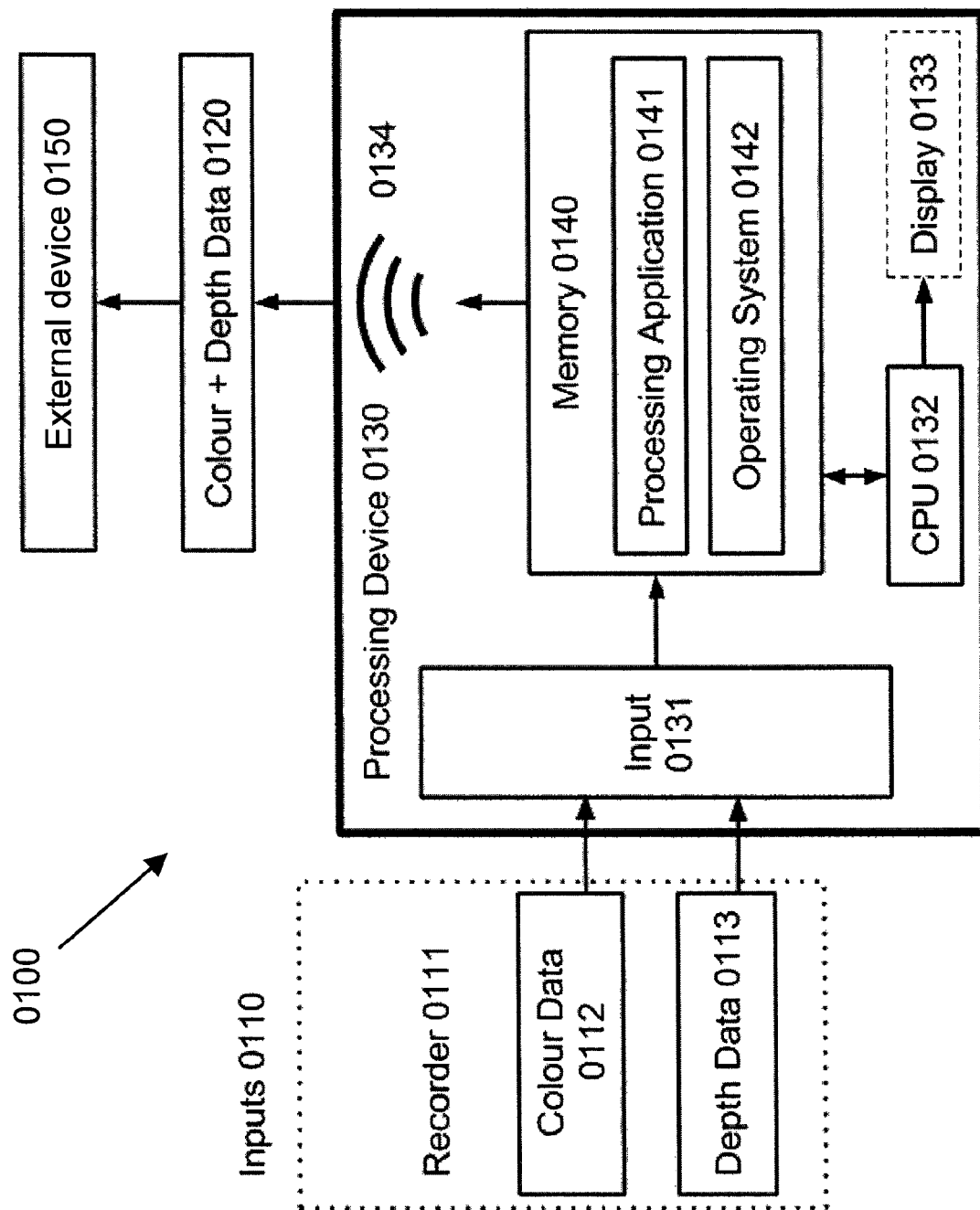
FIG. 1 is a block diagram of a system for performing an image processing method, the system including a processing device.

Referring generally to FIG. 1, an example system 0100 is shown, having inputs 0110, such as recording device 0111 in communication with a processing device 0130. Recording device 0111 may be a camera, or other image capturing device. In some embodiments, recording device 0111 may be a data capturing device or sensor such as a laser based radar (LIDAR) device. Recording device 0111 may capture image data including colour data 0112 and depth data 0113, also known as volumetric image data. The colour data 0113 may be captured as a series of still images or frames. In some embodiments, recording device 0111 may further capture additional data such as sound data or heat data. In some embodiments, recording device 0111 may comprise multiple recording devices or sensors, such as a first recording device for capturing image data, and a second recording device for recording depth data.

Data captured by recording device 0111 is passed to processing device 0130. Processing device 0130 may typically be a desktop or laptop computer. In some embodiments, processing device 0130 may be a tablet or handheld computing device. In some embodiments, processing device 0130 may be a computing system, and may include a server or server system, and/or a number of processing devices in communication over a network. Processing device 0130 may contain an input module 0131, memory 0140, a CPU 0132, display 0133, and a network connection 0134.

Input module 0131 may handle user input to processing device 0130, which may be provided through a number of user input devices (not shown) including touchscreens, keyboards, electronic mice, buttons, joysticks, or other input devices. CPU 0132 may have access to memory 0140 via one or more buses (not shown) which may be wire or optical fibre buses in some embodiments, and may be arranged to facilitate parallel and/or bit serial connections. Memory 0140 may include one or more memory storage locations, which may be in the form of ROM, RAM, flash, or other memory types. Memory 0140 may store program data executable by CPU 0132, which may include an operating system 0142 and a processing application 0141. As program data is executed by CPU 0132, CPU 0132 may write to and read from memory registers internal to CPU 0132 (not shown) to perform intermediate calculations and store temporary data.

Executing program data may cause display 0133 to show data in the form of a user interface. CPU 0132 may be one or more data processors for executing instructions, and may include one or more of a microcontroller-based platform, a suitable integrated circuit, a GPU or other graphics processing units, and one or more application-specific integrated circuits (ASIC's). CPU 0132 may include an arithmetic logic unit (ALU) for mathematical and/or logical execution of instructions, such operations performed on the data stored in the internal registers. Display 0133 may be a liquid crystal display, a plasma screen, a cathode ray screen device or the like, and may comprise a plurality of separate displays. In some embodiments, display 0133 may include a head mounted display (HMD). Processing device 0130 may have one or more buses (not shown) to facilitate the transfer of data signals between components. The buses may be wire or optical fibre buses in some embodiments, and may be arranged to facilitate parallel and/or bit serial connections.

Colour data 0112 may be captured by recording device 0111 in conformance with a predetermined colourspace, where a colourspace is a format or model used for describing the way in which colours can be numerically represented within colour channels, and for describing how the colour information of specific channels is to be arranged. One type of colourspace is an index colourspace scheme, where a numerical index is used to represent each colour from a pre-determined set of colours as a number. The number corresponding to the required colour in the index is used in place of the colour in the image being stored.

Colourspaces that use an index having no relationship to the psycho-visual or physical colour may be called hybrid colourspace schemes. When using hybrid colourspaces, image storage methods that divide the image into blocks before storing them may use two or more reduced size channel representations and an index scheme to blend between the two or more channel representations (JPEG and DXT compression methods, for instance, do this).

For example, S3 Texture Compression (S3TC) uses two 24-bit colours per 4×4 block of pixels, which it blends on a pixel-pixel basis using two bits (0-3) for each of the sixteen pixels in the block. This effectively means that each 4×4 block uses four distinct colours and is represented with five bits per pixel (being (24+24)/16 bits for the block, plus 2 bits), as opposed to 24 bits per pixel normally. In this model, the two bits are the indexed scheme, and the two 24-bits are a reduced scheme.

Another way of considering this is that each 4×4 block is reduced to two pixels, and another sub-image controls the blending. The blending image is a full-size grainy representation of the image, and the colour image is a reduced scale mosaic that gets blended. Modern formats like PowerVR Texture Colour Format (PVRTC) apply this more literally, storing two half scale PNG images and a blending guide, allowing for very small file sizes (1-2 bits per pixel). Using a hybrid colourspace allows the various channels to save data space by each using a specific and reduced colourspace, while closely preserving numerical accuracy.

When an application is executed by CPU 0132 to cause an image based on colour data 0112 to be displayed on display 0133, the colourspace and/or the index scheme used by the image is used to convert the colour data 0112 to a desired display format. In some embodiments, such as for computer displays and digital media, colour data 0112 may be converted to an uncompressed state and temporarily written to a buffer (not shown) in processing device 0130. Colour data 0112 sits in the buffer before being displayed on display 0133 according to the colourspace being used.

As an example, a common colourspace scheme used for image composition is based on a gamut or range of colours that is defined by the interplay between combinations of red, green and blue (RGB). Some containers are configured to be compatible with colourspaces that are configured to store multiple channels of colour data. The typical way an RGB colourspace is used is by recording the amount of red, green and blue in each pixel of the image using 8 bits of data for each colour, recording the level of each colour in a separate colour channel. This allows a gradation of 256 levels of colour intensity per channel. Some colourspaces may support more than three channels, such as four or five channels. Some may support between 2 and 10 colour channels.

Another common colourspace scheme is YUV/YCbCr, which splits the image into a luma component (Y), and two chroma components, UV or CbCr (Chroma Blue and Chroma Red). The luma channel is typically full resolution, with the chroma sub-channels being of a reduced resolution. As the Chroma sub-channels may be distorted or reduced compared to the luma channel, the YUV/YCbCr colourspaces are more suited to video compression than for still images. When used with video, the distortion of the chroma sub-channels is only minimally perceptible due to the short time period each image is displayed for, and the luma channel is visually more perceptible.

XYZ and "Lab" colour are further colourspaces that are frequently used in image analysis and processing, storing colour information in a similar pattern to how the human eye processes colour. Of the major colourspace formats, these more properly represent cyan as negative red and magenta with more accuracy.

CMYK, or Cyan Magenta Yellow Key, is a four-component colourspace model frequently used in printing and goods production. It represents certain colour palettes, such as those containing bright and neon colours, to much greater efficiency, and is used to some degree in digital television displays.

CcMmYyK is an extension of the CMYK colourspace and is noteworthy as a seven-component format, which stores a coarse and fine colour representation for the Cyan, Magenta, and Yellow channels, allowing for further accuracy. It is common for inkjet printers and some theatrical applications.

An important distinction is the way in which the still images, as opposed to video and sequences, are displayed. A still image need only be read and displayed once, and may be displayed for a relatively long amount of time compared to an image in a video or image sequence. Due to this, the priority in displaying the image is to retain the visual fidelity of that displayed image, rather than optimising the time it takes to display the image. Image display programs may therefore use a relatively long time to display an image, compared to video display programs.

When displaying images that make up a video or image sequence, on the other hand, each image must be displayed quickly, and the image must be able to be rapidly and efficiently updated. This often requires complicated processing, and there are numerous competing methodologies for varying platforms and scenarios as to the best way to achieve this.

Both videos and images can be compressed using various techniques to reduce the amount of disc space required to store them. Most formats do this by further sacrificing visual fidelity in favour of achieving a smaller file size. There are some lossless compression formats that do not decrease the fidelity, in which the compressed files are able to be reconstructed exactly bit for bit. These formats primarily exist as processing intermediaries or for theatrical display. Some examples of lossless compression files include ZIP, LMZA, and RAR file types.

Compression schemes like ZIP, LMZA and RAR attempt to identify redundant elements and store them in more condensed forms. Formats like RAR have a general dictionary of commonly used data structures, and replace elements in the original file with references to the dictionary. LMZA constructs its dictionary via a process of hash-chaining and stored seed. ZIP conversely stores its dictionary within the file, so that while LMZA and RAR are unlikely to make a file bigger, ZIP compression can end up with files that are larger than the source file.

As with even older compression schemes, like ARC, these schemes rely on the data to be formatted for compression, with similar data grouped together in the data structure and sufficient redundancy to compress well. While this is often the case for raw containers, such as RAW AVI Video, RAW Image format, BMP Image Format and GIF Sequence Format, it may not be applicable to other more aggressively packed containers, such as PNG.

For images, BMP, PNG, and TGA are common lossless formats. However, even lossless formats can experience image degradation when changing colour depths. For example, changing from a 24-bit to 16-bit colour depth will cause image degradation. PNG is noteworthy for compressing the file size without any image degradation.

Another popular format, PSD from Photoshop, is internally or at load-time represented as a series of PNG or BMP files in a zip-like archive, and is basically a renamed ZIP format. As video files that use lossless compression are relatively large, consumer media rarely uses lossless video, except for analogue media, like video for use with a video home system (VHS). While common video containers like AVI have a lossless RGB mode, such files have bitrates far in excess of compressed containers, frequently by a thousand times or more, and so produce files of a very large size. Due to this, lossless video compression formats are usually saved for editing software like AfterEffects or for digital movie projectors in theatre.

Recording device 0111 may record colour data 0112 in a particular colourspace, which may be a variable property of recording device 0111. In some embodiments, recording device 0111 may further be configured to store image data into one or more pre-defined container formats, which may be lossless or lossy formats. For example, container formats such as motion-JPEG, MP4, MOV, Theora, WMV, or gif may be used for storing image sequences, and PNG, BMP, JPG, TGA, DDS, or HDR formats may be used to store still-images.

Image containers, for images composed of channels, such as hybrid colourspaces (as opposed to indexed colourspaces), typically contain entire representations of the components of the image. These may not be the same scale as the original image, and for 'blocky' compression types they may include data structures that allow the container to more effectively upscale the channels that have had their resolution reduced.

'Blocky' compression refers to the image compression where the file is structured into groups of pixels. Blocky compression is typically used for most mature heavily used formats. For example, JPG and PNG files both use blocky compression.

Video and image sequence containers work much the same way as image containers, however relatively few encode every frame as a full image. Most typically, video and image sequence containers only store differences between the sequential images in the sequence, with fairly few exceptions (for example, Motion JPEG and Still Image Sequences). For the sake of minimising file size, video containers often discard more information than most image containers, resulting in the images making up video or image sequence files being comparable to highly lossy image formats.

Examples of some other common image sequence containers include:
  Graphics Interchange Format (GIF), which stores whole images per frame, and includes bitmasks for each frame that represent which data is included for each frame definition;
  Motion JPEG, and many uncompressed intermediary formats, which store whole frames as discrete images with timestamps;
  Theora, H264, and many block based models, which store various types of key frames and partial frames, partial frames typically following similar schemes to the GIF-compression for representing which sub-image blocks will be present or expected in a given frame.

Once captured, colour data 0112 and depth data 0113 are passed by recording device 0111 into input module 0131 of processing device 0130. The captured colour data 0112 and depth data 0113 are stored in memory 0140, where they are accessible to processing application 0141 through access granted by the operating system 0142. In some embodiments, colour data 0112 and depth data 0113 may have been previously captured or created by an image capture or creation means, and may reside in memory 0140 within processing device 0130, or in an external memory location. In some embodiments, processing device 0130 may be configured to receive colour data 0112 and depth data 0113 from an external location, which may be an external device. In some embodiments, colour data 0112 and depth data 0113 may be received by processing device 0130 over a wired or wireless network connection. The processing application 0141 is executable by CPU 0132 to access the stored colour data 0112 and depth data 0113 and to process this data.

Processing device 0130 may be further configured to communicate with external device 0150 via network connection 0134. In some embodiments, input colour data 0112 and depth data 0113 may be processed by processing application 0141 in order to produce output colour and depth data 0120, which may be sent by processing device 0130 to one or more external devices 0150 via network connection 0134. The processing of colour data 0112 and depth data 0113 may include encoding and packing of the data into an image container. According to some embodiments, the data format of the image container that the data is packed into may be configured for colour data storage. According to some embodiments, the data format of the image container that the data is packed into may be configured for colour data and auxiliary data storage.

Encoding and packing are the processes by which data is converted from its representational form (such as colour data in some embodiments) to the underlying layout or bit arrangements. Only certain containers actually store colour data in a way that directly correlates to the source image (such as BMP, RAW, and TGA), whereas other formats have an emphasis on size and use a variety of compression techniques in order to produce smaller file sizes.

For instance, while the portable network graphics format (PNG) uses a lossless compression (i.e. if given 24-bit RGB or 32-bit RGBA colour as an input, you will get the same values out of the container after it has compressed and saved your image), it still has a quality versus speed setting that allows the author of the file to control how computationally expensive its unpacking is compared to the total number of bits the container contains. Such settings are not uncommon for image containers.

Packing and unpacking will typically (but not exclusively) refer to data arrangement, without transformation, whereas encoding and decoding typically imply transformation of the data itself. However those distinctions are non-rigid and the language used for file formatting is ubiquitous.

For most containers, images are traditionally indexed starting in the top leftmost pixel, though conventions occasionally start in the bottom left. Typical image formats will define colour data as a long, sequential array of pixel data to be interpreted by the image specification. Advanced image formats, such as those used in most video formats, store information in blocks, or discrete sub-images, that are typically reconstructed into a display device's hardware prior to display.

Existing format containers may support multiple colour and/or luminance channels in varying colourspaces. While many image formats and the occasional video format allow for encoding of auxiliary channels (such as transparency or exposure), stratification is traditionally an issue due to the low numerical precision used by these formats. Some formats leverage human visual anomalies to reduce data size for reduced noticeable cost to visual fidelity. Others focus on more extensive data compression at the cost of visual fidelity.

Image formats like .TGA and .PNG can support auxiliary channels, for example by containing specifications to optionally employ a 32 bit arrangement as 4 channels of 8 bits each. This covers R, G, B and A (Alpha). The A is traditionally used for transparency, or exposure. Some image formats may support multiple auxiliary channels. Some image formats may support between 1 and 40 channels or components of colour data and between 1 and 40 channels or components of auxiliary data. In some embodiments, where multiple recording devices are used to capture the data, each recording device may contribute a number of colour and/or depth components to each image. Occasional video methods, such as Theora, and various intermediary formats used in video authoring, will allow for auxiliary channels. In practice, however, support is limited and prone to variation in both performance and hardware compatibility.

Stratification is, in the general sense, an artefact of inaccurate storage. It is typically witnessed as values being rounded into the smallest discrete brackets in which they can be represented, and the accordant loss from being unable to entirely store a source input. This creates inaccurate results which may visually appear as banding, blocking, or image degradation, and lead to further numerical inaccuracy.

Stratification always happens; it is present in every digital representation of any analogue data. All digital media formats are designed to allow for sufficient accuracy to attempt to make this unnoticeable to the human eye. Beyond inaccurate data representation, stratification can lead to crude and largely unappealing representations of depth and colour.

Artefacts that one may expect from such image storage include:

Banding—Rounding of signal values becomes visible when there is insufficient accuracy to appear continuous, typically apparent as stepped or posterized appearances;

Blocking—Block compression schemes are typically lossy in being able to match the input description for a given block, and thus attempt to optimize for specifically determined features (varying by implementation). These approaches, particularly at high degrees of compression, tend to make underlying block patterns visible and images will appear composed out of boxlike block structures; and Unwanted sharpening/blurring—Gradient methods in particular often fail to properly replicate underlying signals, and will result in frequency-domain issues, such as sharpened or dulled transitions.

These artefacts are non-exclusive and may co-exist in any combination.

Commonly used image and video containers include the provision for colour as perceived by the camera but not depth from the camera. In other words, predefined image containers may be formatted for colour data storage only. This means that any three dimensional image or video has to use some kind of work-around to accommodate the shortcomings of the original design for these containers.

Unlike colour data, for which a large body of work has been devoted towards, depth data presents unique challenges, both in acquisition and storage.

Where colour data has an intuitive minimum and maximum range from the darkest observable colours to the brightest; depth information is not bound to the same restrictions, but is instead based arbitrarily on the capture range, making effective storage and handling difficult.

Depth is typically recorded as a fixed distance value from a known capture point. Some schemes, such as a reciprocal compression (as opposed to linear, or gamma based) represent closer depth values with greater accuracy. This closely mirrors how most sensors can generate data, losing accuracy over distance. However, sensor accuracy varies widely between capture methods. Laser scanners are capable of capturing depth measurements to the nanometer level, where various market sensors capture between the millimeter and centimeter accuracies, with some surveying style equipment capturing decimeters to meter accuracies.

Depth as a component is usually a single channel. While it is considered low frequency, as more often than not the data appears continuous, rather than with sudden shifts or discontinuity, it doesn't necessarily correspond strongly to observed colour. Similarly, bound cases for colour and depth are based on two unrelated sensor components or image properties, exposure and range respectively.

Typically, colour and depth information is not captured from the same viewpoint, and needs to be converted out of respective image spaces and reprojected into a unified colour/depth space. One consequence of sensors being physically separated leads to holes and missing values in either the depth or colour feed, and the process of matching colour and depth requires fuller knowledge of camera and lens specifications than may be available at runtime.

In order to overcome this, in some embodiments, the colour and depth data must be spatially correlated before the packing process is implemented. This may be done by correlating the depth data with the colour data by adjusting the values of one or the other of colour and depth data. This is done to reproject one of colour and depth data into the virtual space of the other of colour and depth data, so that the two images appear to be from the same perspective.

The commonly implemented method is to arrange points into one of the two discrete camera spaces (colour or depth), which becomes the dominant feed. Subsequently, the depth is resolved to the dominant feed in 3D, and projected onto the colour data. In other words, the colour data and the depth data are temporally correlated, but not exactly spatially correlated. Ultimately, selection of the dominant feed becomes arbitrary and unavoidably introduces data loss. However, spatially correlating the data sets as described above can reduce the issues arising from the spatial differences in the images.

Another scheme involves having the colour sensor assuming the same position as the depth sensor, just not at the same time. Instead, the colour data is captured from a sensor in a particular location, then the depth sensor is positioned in the same location to capture the depth data. In other words, the colour data and the depth data are spatially correlated, but not temporally correlated. Subsequently, the position and alignment based matching is performed on the two sets of captured data, as is common for laser scanners. However these techniques are inappropriate for temporarily variant subjects, such as moving or flickering objects, and is accordingly better suited and typically used for still capture only.

Microlens capture devices, such as light field cameras, obtain depth and colour from the same virtual viewpoint, however multiple depth values may exist for a given colour, and colour representation for light field results is itself a still highly active field.

Some schemes opt to avoid image-space methods altogether, such as by storing data as point cloud schemes with 3D-positions and colour values as opposed to colour and depth associations. These schemes are not dealt with in the embodiments described.

In some embodiments, processing application 0141 may be configured to store colour data 0112 and depth data 0113 according to a predetermined container format in order to address some of the limitations of existing depth data storage means as described above. In some embodiments, processing application 0141 may be configured to store colour data 0112 and depth data 0113 together in a single image using a container wrapping method with a fixed offset to store depth data 0113 alongside the colour data 0112, by increasing the bounds of the image to which the data is to be stored.

According to some embodiments, the bounds of the image container to which the data is to be stored may be based on the size of the colour data 0112 and depth data 0113.

Where colour data 0112 and depth data 0113 each contain X by Y pixels of data, the image container may be sized to store around X by Y pixels of colour data and around X by Y pixels of depth data. This allows colour data 0112 and depth data 0113 to be stored in a single image without reducing the resolution of either colour data 0112 or depth data 0113.

Processing application 0141 may be executed by CPU 0132, and cause CPU 0132 to retrieve colour and depth images from memory 0140, process the images according to instructions contained within processing application 0141, and to store the new composite image back into memory 0140.

Figure 2:
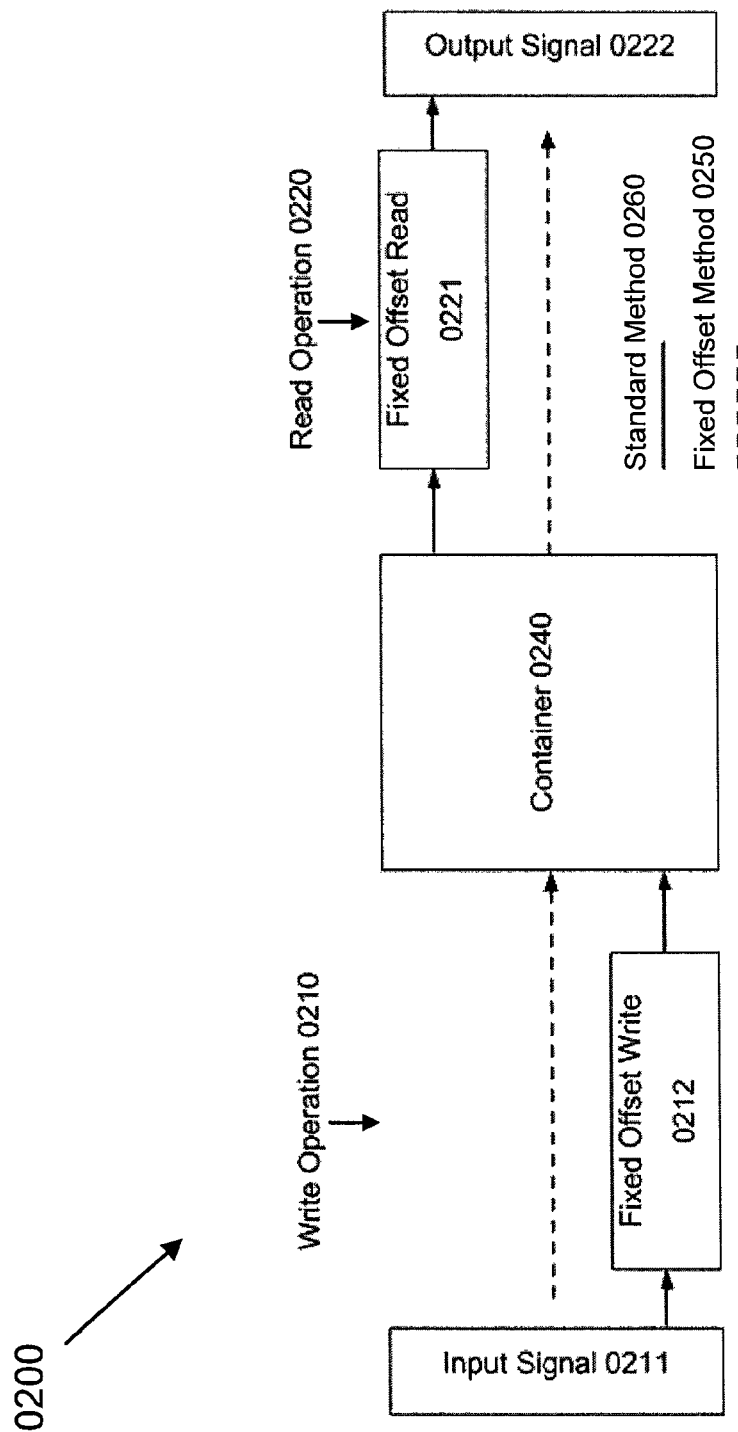
FIG. 2 is a block diagram that illustrates a packing and unpacking process that may be used by the image processing system according to FIG. 1.

Referring generally to FIG. 2, a block diagram 0200 of container wrapping methods consisting of a write operation 0210 and a read operation 0220 is shown. Diagram 0200 shows a standard method 0260 of wrapping an input signal 0211 into a container 0240 alongside a fixed offset method 0250.

For method 0260, an input signal 0210 is written directly by CPU 0132 into a container 0240 residing in memory 0140. Input signal 0210 may be received from recording device 0111, from another external device, or a memory location. Container 0240 can then be read directly by CPU 0132 in order to obtain the output signal 0222 for display on display 0133. Input signal 0210 may contain video or image data made up of pixels, which may be arranged in samples, each sample being made up of a group of pixels. Each pixel or sample may contain multiple channels of data, which may include red, green and blue channels (for RGB colourspaces, for example), luminance and chrominance channels (for YUV or YCbCr colourspaces, for example), or other channels depending on the colourspace being used.

Fixed offset method 0250 causes CPU 0132 to first apply a fixed offset 0212 to the position of the data within input signal 0211, then to write the input signal 0211 to container 0240 based on the calculated offset position. This can be used to store colour data 0122 alongside depth data 0133 within a single image, by applying a horizontal or vertical offset to the position of the data being stored. For example, the depth data can be stored offset horizontally from the colour data, so that both sets of data are stored within a single image.

When conducting a read operation 0220, CPU 0132 performs an inverse of the fixed offset write operation 0212, allowing a fixed offset read operation 0221. The read data is then output as output signal 0222, which may be displayed on display 0133. During read operation 0220, the same image is read multiple times, the separation of the reads in memory being based on the size of the fixed offset.

Figure 3:
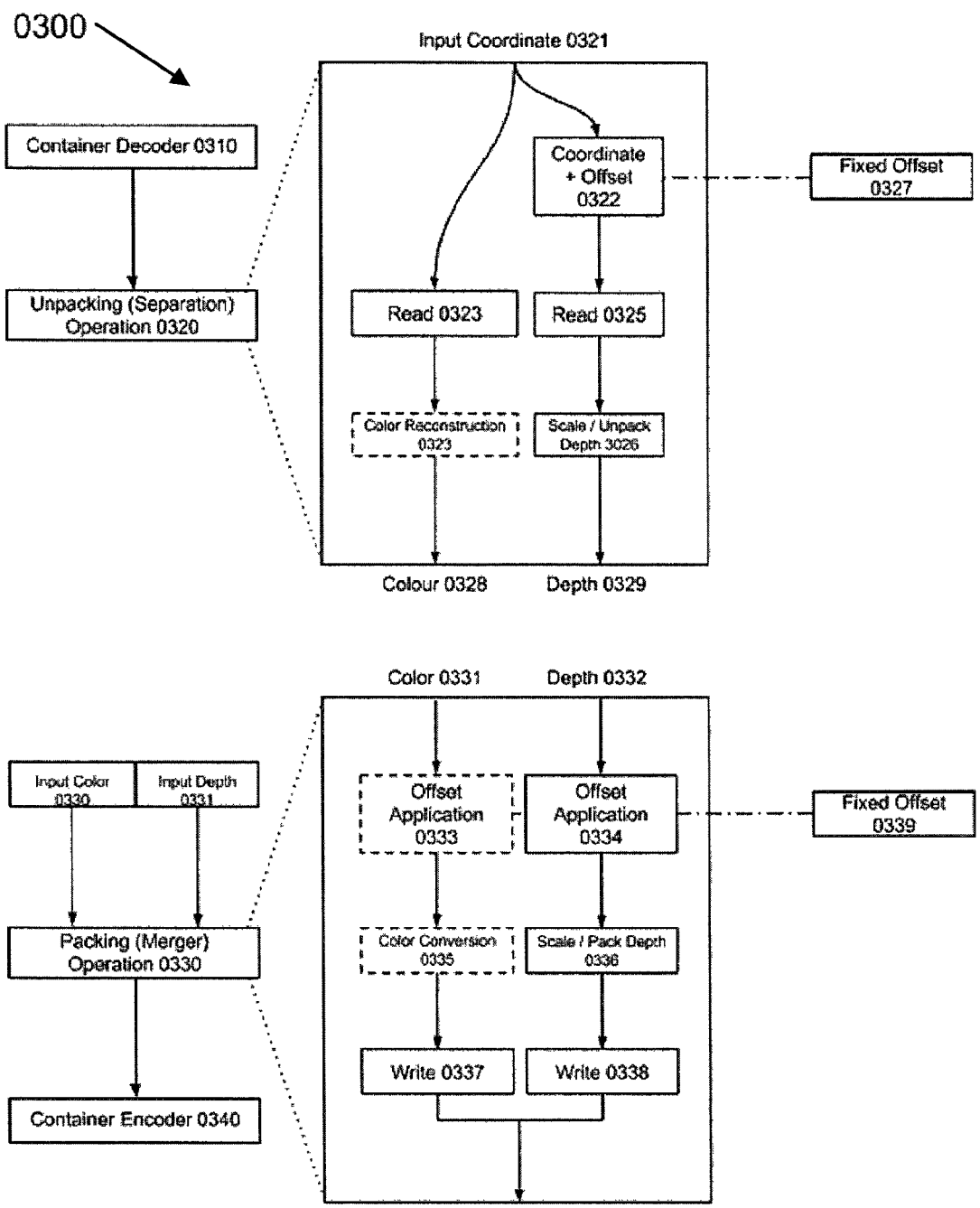
FIG. 3 is a block diagram that shows how the unpacking and packing operations of FIG. 2 work in more expanded detail.

Referring generally to FIG. 3, an unpacking and packing process 0300 is shown, which depicts the unpacking (separation) step 0320 and packing (merge) step 0330 performed by CPU 0132 when executing processing application 0141. Unpacking step 0320 and packing step 0330 are respectively synonymous with the read 0220 and write 0210 steps as described above with reference to FIG. 2.

In the case of unpacking step 0320, processing application 0141 is executed to cause CPU 0132 to retrieve a coded image or image sequence from container decoder 0310. The container decoder 0310, may act as a frame buffer and fully unpack the image to be stored in a plain, readable format, or, in cases where it may be impractical to have a large buffer, container decoder 0310 may wrap the image instead of unpacking it completely, while still allowing ordinary read operations to be performed on the image. CPU 0132 then causes the coded image to be passed to unpacking operation step 0320, which takes an initial input coordinate 0321 to begin the unpacking operation.

CPU 0132 transforms input coordinate 0321 using a fixed offset 0327 (which may be stored externally to container 0240, such as in a filename, calibration file, mark-up file, or other associated file, or in the metadata of an associated file), in order to allow data to be read from the correct location. The fixed offset 0327 should be the same offset as that used to encode the original image. In some embodiments, the coordinate+offset 0322 is applied to the depth information 0329 in order to retrieve this information from the original image. In some other embodiments, the offset may instead be applied to the colour information 0328.

By performing read operations on images received from either the frame buffer or container decoder 0310 using the transformed coordinates (coordinate+offset) calculated based on the fixed offset 0327, the relevant colour 0328 or depth information 0329 can be retrieved. In the illustrated embodiment, the depth information 0329 may subsequently be reconstructed using a scale/unpack depth step 3026. Optionally, a colour reconstruction step 0323 may be performed if the colourspace of the image has been changed to accommodate the depth information 0329.

The packing (merger) operation 0330, correspondingly, shows the reverse operation to that shown by unpacking operation 0320. CPU 0132 retrieves input depth 0332 and colour 0331 from original images or image sequences and combines these by performing the packing operation 0330, to prepare the images for input to the container encoder 0340. In the illustrated embodiment, depth information 0332 has a fixed offset 0339 applied by CPU 0132 executing the offset application module 0334 of the processing application 0141. In some embodiments, CPU 0132 also applies packing parameters to the depth information 0334 at step 0336, in order to scale or pack the depth information 0334. In some embodiments, corresponding offset application module 0333 of processing application 0141 may be executed by CPU 0132 to apply a fixed offset to the colour information 0331. In some embodiments, where the colourspace has been converted or otherwise made to accommodate depth information 0332, a colour conversion phase 0335 may be applied by CPU 0132 to translate colour information 0331 to a desired form for storage.

At the scale/pack depth step 0336, the range and/or storage methods for depth information 0332 are applied to the colour and depth information by CPU 0132. At the write operation 0338, depth information 0332 is written by CPU 0132 to the container based on fixed offset 0339. Colour information 0331 is written to the container during the corresponding write operation 0337 for colour.

The unpacking operation 0330 causes CPU 0132 to read the frame through methods that vary from container to container, and is notably (with packing specifics) the definition of a container. Some examples of how different container formats are read include:

- Bitmap, Targa, RAW and HDR specifications directly encode colour values on a per-pixel basis as a sequence from the top-left of the image, with image size defined in the header;
- PNG, DDS, and JPG store 'blobs' or blocks that contain sub images which are composited into an uncompressed buffer for display; and
- Indexed colour formats (such as GIF and certain bitmap variants) typically lead with a list of all colours to be represented, and then for each pixel refers back to the starting array (this approach/strategy is best suited to low-palette images).

The encoding and packing steps are different for different containers. The actual mechanisms vary. Some examples of techniques used during encoding and packing include:

colourspace based bit accuracy (for example r8b8g8, with 8-bits to each, is a common 24-bit scheme, or r4b4g8, a common 16-bit colour model);

mixed resolution sampling where colour components may be varying sizes;

block based sub-images where an efficient means of packing a discrete sub-image is repeated to contain a whole image as a collection of sub-images; and gradient based schemes in which colours or components are broken down into a frequency domain and represented as gradients.

The packing operation 0330 may include a compression step. Lower level bit representations of packing vary, depending on the containers compression and storage model. For certain raw images, like Bitmap and Targa, data would be represented with depth structures in a sequential layout. For more complex containers, such as many video containers, and lossier image formats (such as JPEG, or h264), data exists more as an image-space concept that isn't well represented bit-wise in memory.

Figure 16:
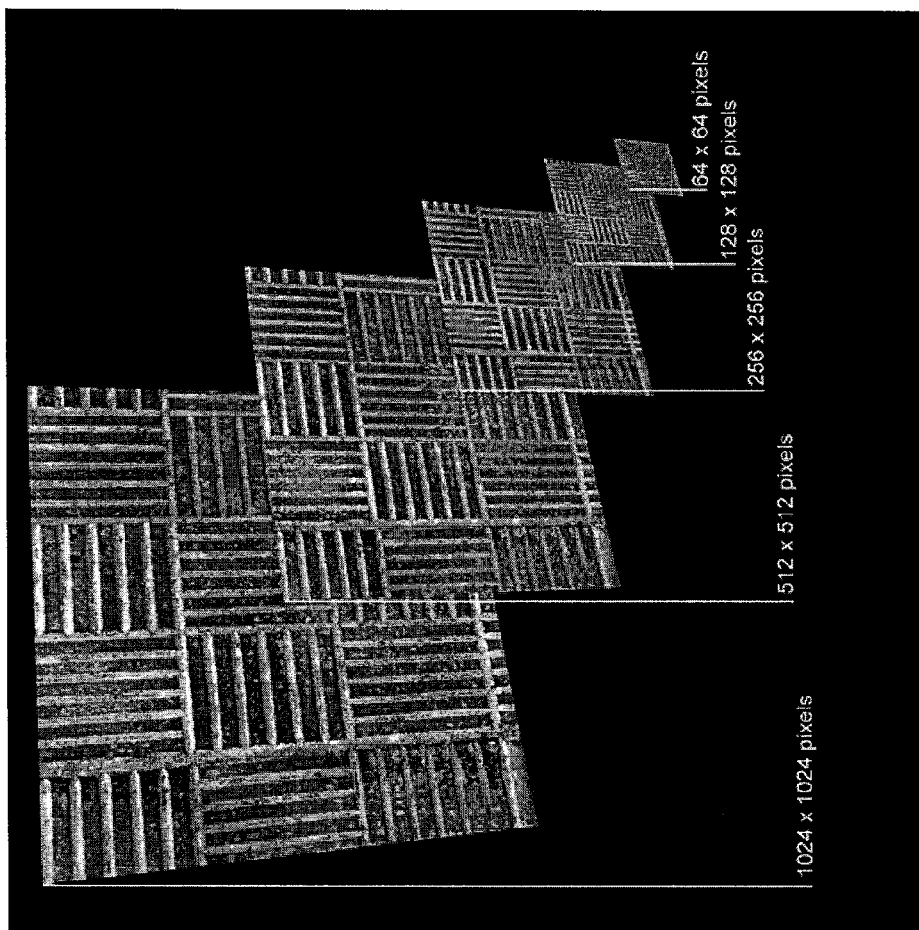
FIG. 16 is a diagram showing mipmaps being used for image compression.

One of the more common approaches to video compression is to take whole blocks of pixels and represent it with a smaller, discrete sub-images or 'blocks', as shown in FIG. 16. These blocks may be referred to as mipmaps.

Mipmaps are pyramidal buffers, where at the base, a whole image is represented by a stack of incrementally reduced-scale duplicates. The duplicates are calculated based on clean divisions of the root image. This means that as the image size is used for the offset, the pixel offset of each smaller mipmap will be aligned, as the offset is a clean division of that (now smaller) size.

Graphics hardware is tuned for the operation of being able to read into the stack of textures, and this is typically used for reducing aliasing and improving texture fill rate on real time devices. There is a secondary application in image processing which can provide rapid access to lower frequency states of the base image.

Advanced filtering techniques such as Sobel filters, bilateral filters, and other approaches that analyse an image in frequency space (such as blurring) can benefit by reading mipmap values. A simple example would be to sharpen the image.

Ideally, a colourspace can be compressed and recovered without additional data loss or error. Ideal models accurately represent depth data as faux-colour data. However certain approaches, like mixed-resolution (such as chroma subsampling) cause, as a side effect of the container, colour values to be shared between adjacent pixels.

Schemes like chroma subsampling operate by having the Y (luma) channel represented with minimum compression, as it has the highest perceptual importance for image quality. Due to the reduced need for chroma fidelity over luminance fidelity, colour component can be compressed significantly more that than the luminance component. The luminance component is still compressed, but at a lower compression rate than the chroma or colour component.

Figure 4:
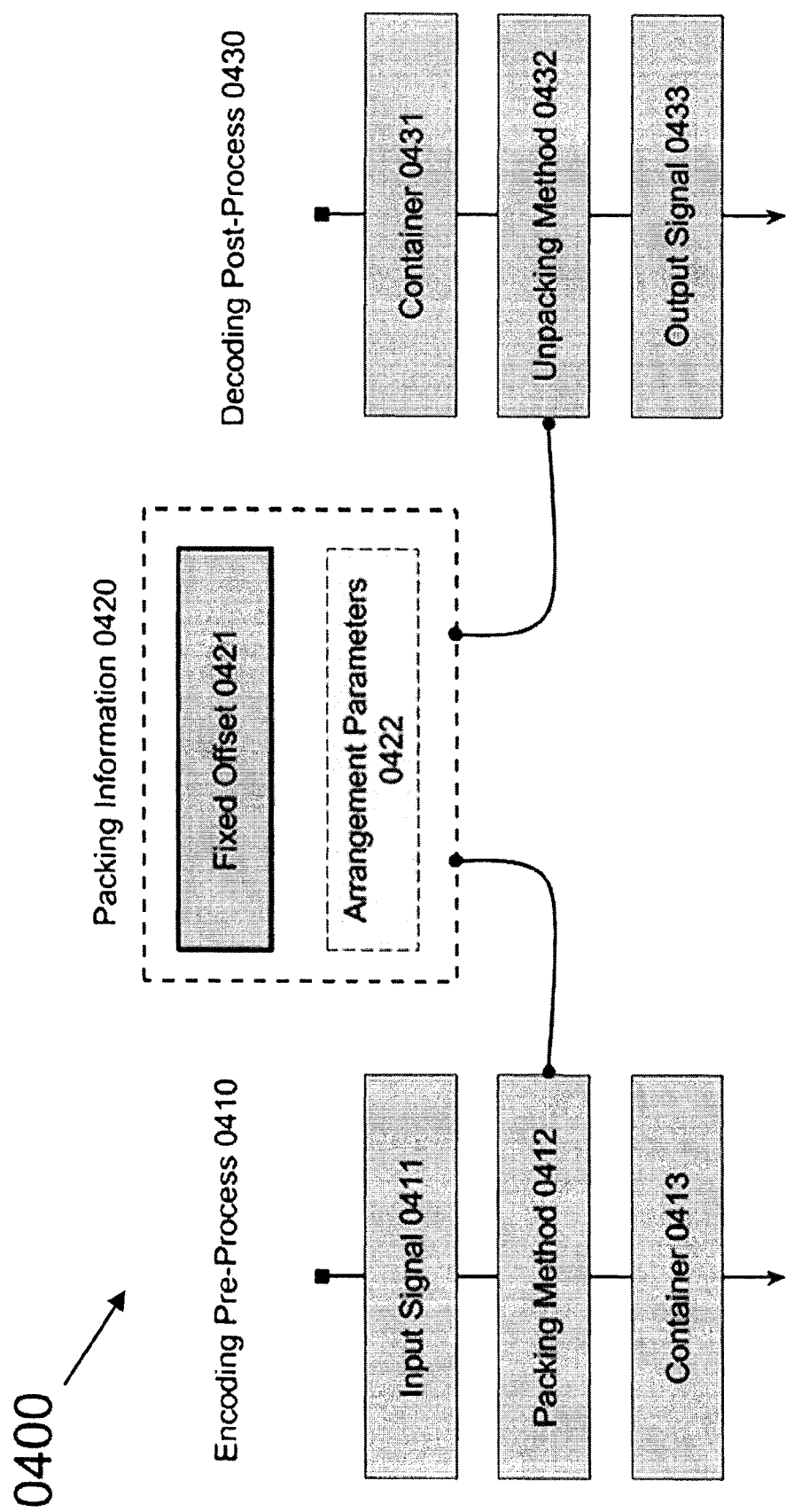
FIG. 4 is a block diagram overview of the signal paths of FIG. 3 shown in more detail.

Referring generally to FIG. 4, a block diagram 0400 is shown. Block diagram 0400 includes an encoding pre-process 0410 and a decoding post-process 0430 which are performed by CPU 0132 when executing instructions according to processing application 0141. Pre-process 0410 and post-process 0430 are distinct processes performed independently, but which require some parameters to be shared in order for decoding post-process 0430 to operate correctly. For example, fixed offset value 0421 and optionally arrangement parameters 0422 must be accessible by both pre-process 0410 and post-process 0430, and may be written into the metadata of container 0240 in some embodiments. Arrangement parameters 0422 may be required when a particular layout or transformation of the colour or depth data is to be performed.

Encoding pre-process 0410 may be performed by CPU 0132 executing processing application 0141. Pre-process 0410 may cause CPU 0132 to retrieve an input signal 0411, which may be retrieved from input module 0131 or from memory 0140. Subsequently, a packing process 0412 may be performed on input signal 0411. Packing process 0412 may include the steps of packing operation 0330, using packing information 0420. The packed data is then stored in container 0240 in container step 0413.

Decoding post-process 0430 may be performed by CPU 0132 executing processing application 0141. Post-process 0410 may cause CPU 0132 to retrieve information form a stored container 0240 at container step 0431. Subsequently, an unpacking process 0432 may be performed on container 0240. Unpacking process 0432 may include the steps of unpacking operation 0320, using packing information 0420. The data is unpacked to produce output signal 0433, which may comprise colour and depth data 0120. In some embodiments data 0120 may be sent to an external device 0150 via network connection 0134.

Figure 5:
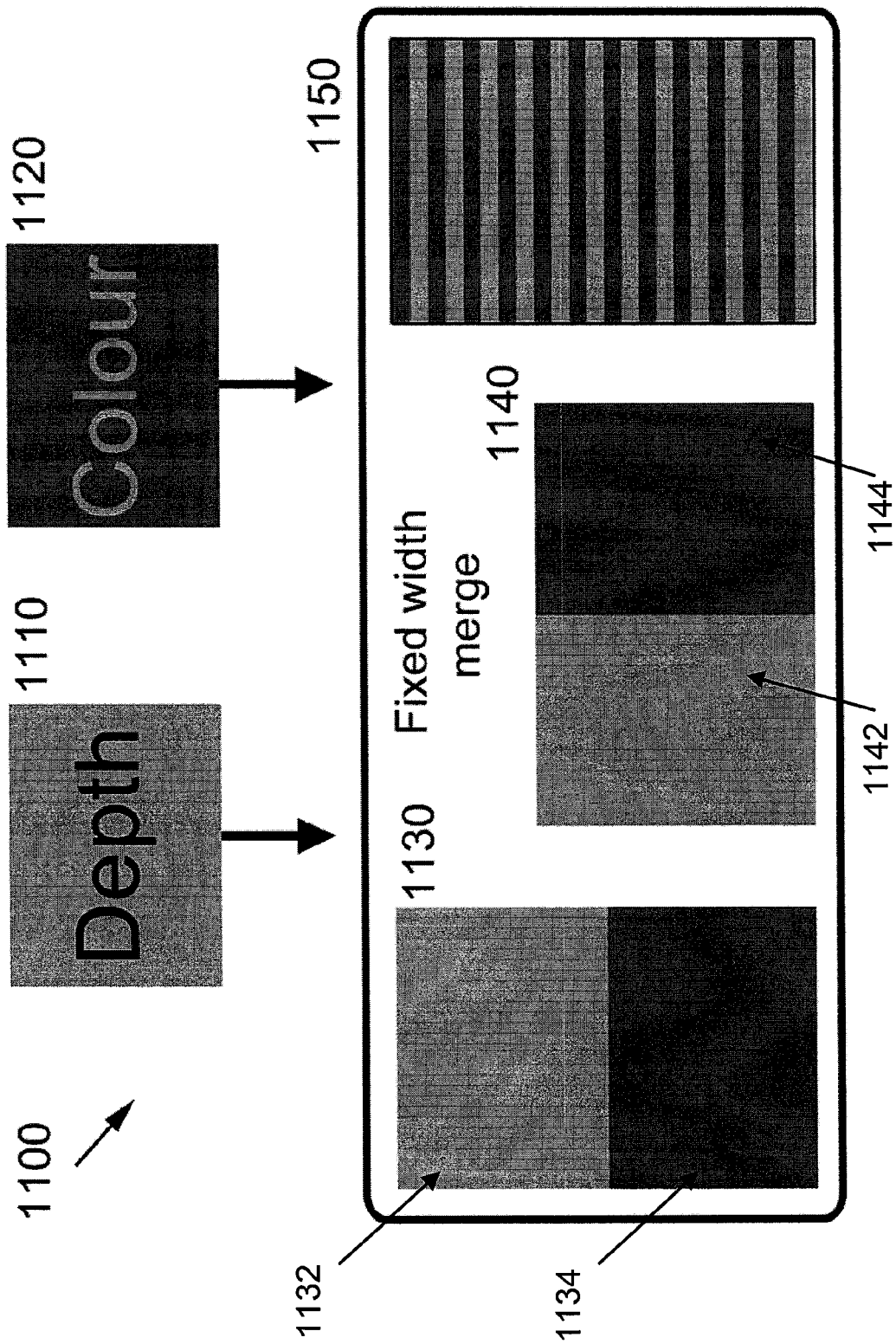
FIG. 5 is a simplified diagram of how the bounds of an image or video frame might be expanded to include both the colour and the depth information from that frame.

FIG. 5 is a block diagram 1100 showing depth and colour information from original images 1110 and 1120 being stored with different offset sizes according to fixed offset method 0250 to produce new images 1130, 1140 and 1150. The resulting images 1130, 1140 and 1150 each contain two sub-images within them, being a combination of the two original images (the depth 1110 and the colour 1120). The images may be combined by a machine-implemented method executed by CPU 0132. This method may involve writing to memory a first block of image data from image 1110; and subsequently writing a second block of image data from image 1120, repeating this method until all of the data from images 1110 and 1120 has been written to memory. Each image may contain X by Y pixels of either colour data or depth data. In this document, X and Y are used as numerical variables to represent positive integer numbers that can be used to define an image size. In some embodiments, it is important that the colour data and depth data are the same size and resolution as each other.

When an offset size equal to the size of the original images 1110 and 1120 is used (i.e. the size of each block of data is the image size X by Y), the result is image 1130, with the new image being twice the height of the original images. This places the depth 1110 and the colour 1120 in a vertical arrangement 1130. In the illustrated embodiments, depth image 1110 is written first, so that the depth sub-image 1132 is above colour sub-image 1134. In other embodiments, colour image 1120 may be written first and the sub-images 1132 and 1134 may appear in the opposite order. The order of the sub-images may be an arrangement parameter 0422 stored in the metadata of container 0240, or stored externally to the container. When the resulting image 1130 is being unpacked, a read block size of half of the resulting image 1130 would be used.

When an offset equal to the width of the original images 1110 and 1120 is used (i.e. the size of each block of data is the image width X), the result is image 1140, with the new image being twice the width of the original images. This places the two images 1110, 1120 in a horizontal arrangement. In the illustrated embodiments, depth image 1110 is written first, so that the depth sub-image 1142 appears to the left of colour sub-image 1144. In other embodiments, colour image 1120 may be written first and the sub-images 1142 and 1144 may appear in the opposite order. The order of the sub-images may be an arrangement parameter 0422 stored in the metadata of container 0240, or stored externally to the container.

If the offset is equal to one pixel, the result is image 1150, which results in a horizontal interlacing of the two sets of information. If the offset is set to the image height, vertical interlacing occurs. In the illustrated embodiments, colour image 1110 is written first, so that the colour component appears first. In other embodiments, depth image 1120 may be written first and the colour and depth components may appear in the opposite order. The order of the image components may be an arrangement parameter 0422 stored in the metadata of container 0240, or stored externally to the container.

In some other embodiments, other sizes of offset may be used. For example, when block-techniques are used in image compression, the offset may be selected to match the size of the blocks. In some embodiments, the offset size may be a multiple of 8 pixels, such as 8, 16, 32 or 64 pixels. In each case, the offset chosen is stored as fixed offset 0421, and used in both the write 0212 and read 0221 operations.

There are several benefits to having the offset as the whole height or width of the image, as in images 1130 and 1140. For example, having the offset as the whole height or width makes it simpler to calculate the exact bounds of the colour and the depth sections within the container 0240. As the height and width are both fixed properties of the container 0240, the offsets are thus both fixed and do not have to be stored externally of the container 0240. As a container's decoding already takes the height and width into account, this speeds up and simplifies the fixed offset operations.

Also, any compression being applied to the resulting image can be applied to each sub-image of container 0240 separately, ensuring that there are no blurring artefacts across the border between the two sub-images.

Furthermore, any stitching and combining operations can be applied easily to the resulting image, as editing software is capable of doing horizontal and vertical layouts without significant extension, and when this process is implemented on a GPU, the frame buffers can be combined for processing runtime on most platforms.

Having an offset equal to the whole width or height of the image may also produce fewer faults than when using a smaller offset that produces interlacing or uses blocks, as when using the whole height or width, blocking artefacts will not be interrupted by narrow features that occur from smaller offsets. One disadvantage to using image height or width for an offset, however, is that this technique may be less efficient in terms of cache usage for software implementations, as for most containers, the depth and colour values will be further apart in memory, decreasing the likelihood of the relevant data being in the cache.

Figure 6:
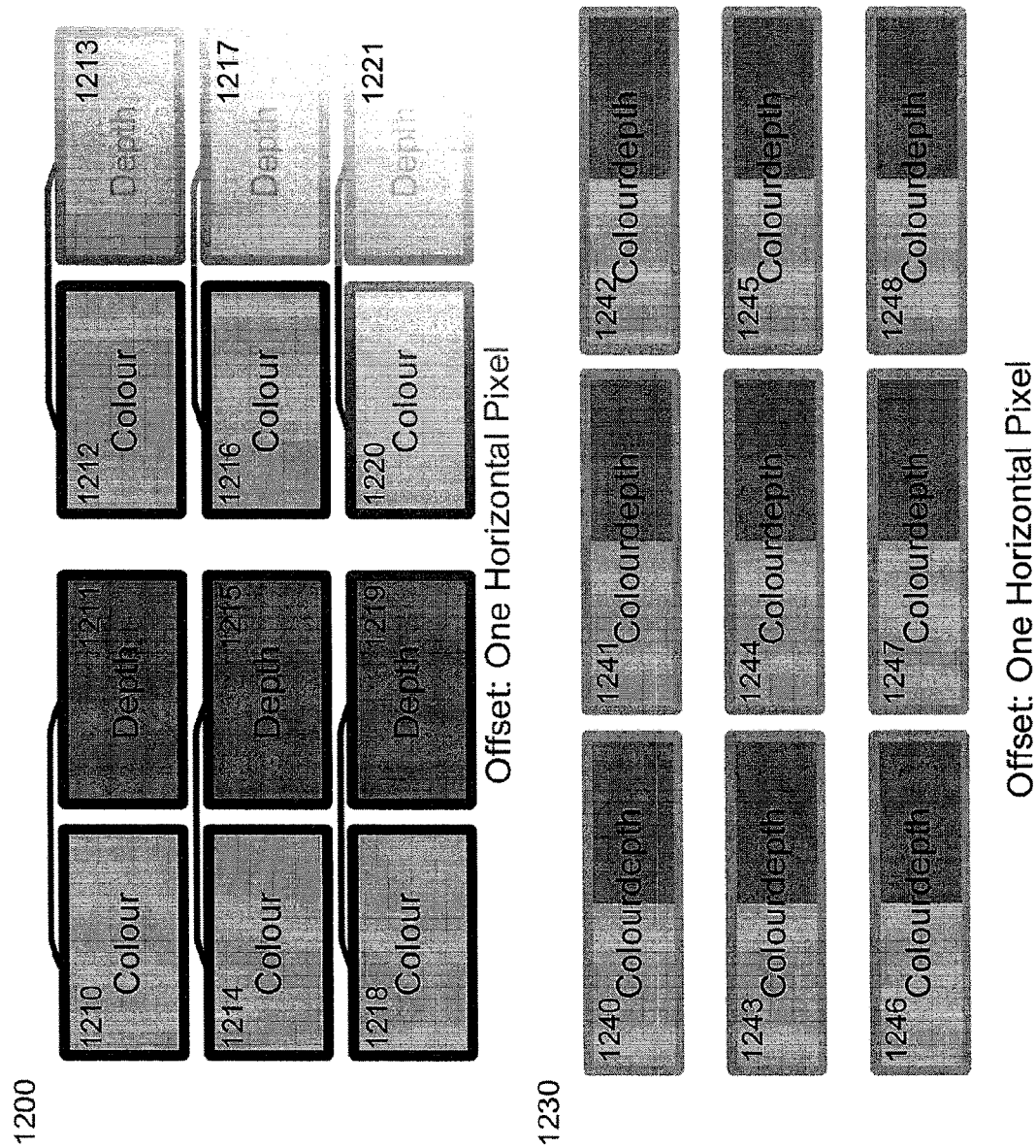
FIG. 6 is a diagram of the way in which an image or video frame might have the colour and the depth information interlaced together, pixel by pixel.

Referring generally to FIG. 6, diagram 1200 is shown, illustrating side-by-side pixel level pairing. Each pixel pair comprises a colour sub-component (1210, 1212, 1214, 1216, 1218, and 1220) and a depth sub-component (1211, 1213, 1215, 1217, 1219, and 1221). Starting with the first pixel pair, colour 1210 and depth 1211 pixels are placed side by side and combined to create composite pixel 1240 as shown in diagram 1230. The process is repeated for each colour pixel pair.

The process illustrated in FIG. 6 is that of an offset of one horizontal pixel. When the resulting image as shown in 1230 is to be read, the colour image is created by reading the colour pixel of pixel pair 1240, and aligning it next to the colour pixel of pixel pair 1241, and so on.

The process is repeated for the depth unpacking. Depth 1211 is extracted from pixel pair 1240 and placed next to depth 1213 from pixel pair 1241, and so on as described above.

If the offset is a single pixel, either horizontally 1200 or vertically 1150, the effective packing is synonymous to interlacing. Interlaced models can have some disadvantages, as the colour and depth data typically varies in low frequency, and block based container-level packing may produce undesired artefacts such as leaking across colour and depth. When using containers not designed to store depth information, it is possible that that values from different channels or pixels may become intrinsically linked to one another, such that modifying one will cause the value of the other to shift. This effect is typically due to compression limitation for a container. However, interlacing may have some advantages in terms of cache-coherency if implemented at a software level, as when reading data from container 0240, the depth and colour data is highly proximate in memory 0140. According to some embodiments, it may therefore be desirable to have the offset set as less than the size of the original colour or depth image. Interlacing may also be considered fundamentally an extension of the lower level bit representation of packing at a higher scale, and in certain uncompressed image containers such as bitmap or raw, each pixel value can be thought of as being twice the normal width.

Figure 7:
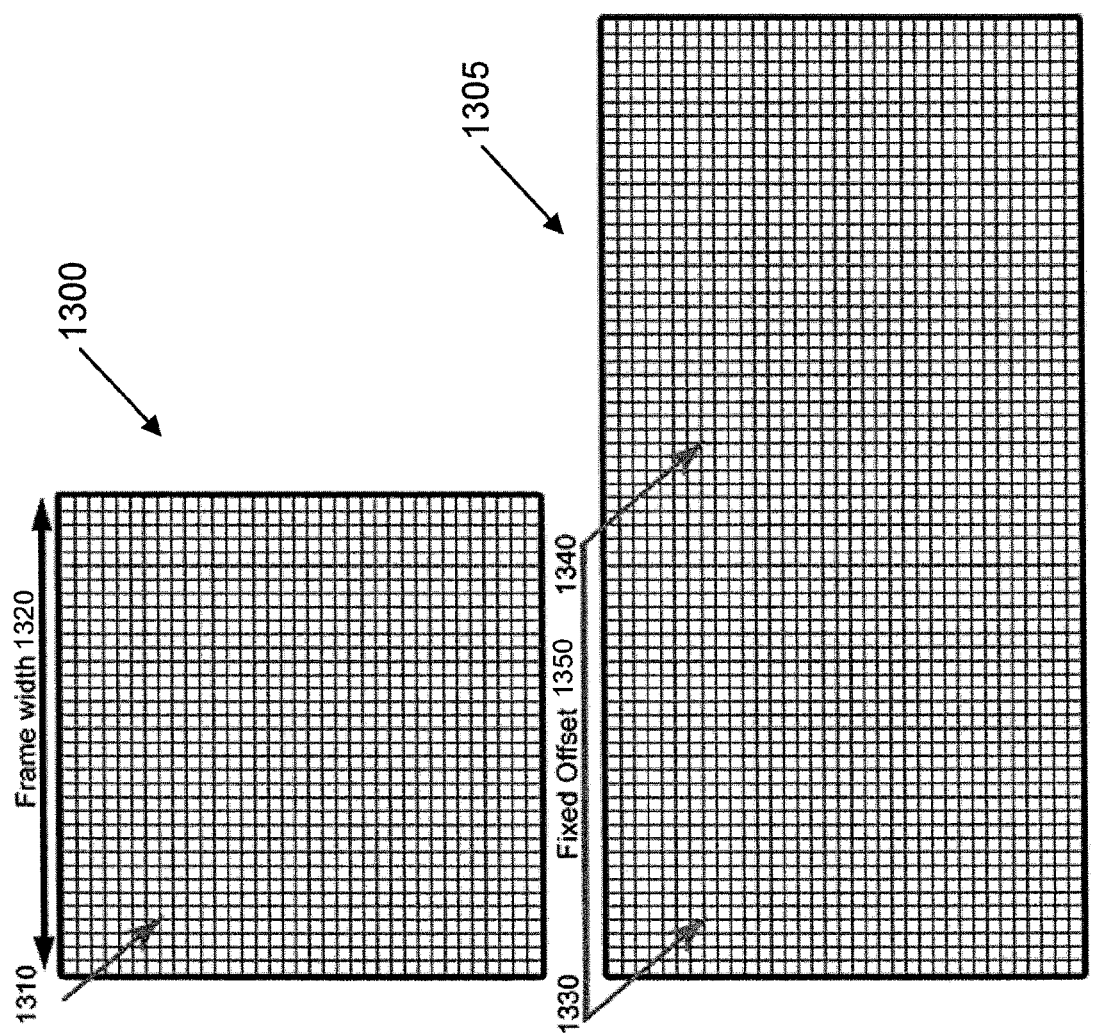
FIG. 7 is a diagram that illustrates how a fixed offset can be applied at read time to read the colour and then (after applying the offset to the next read location) the depth information for that previous colour pixel.

Referring generally to FIG. 7, an example of how a fixed width offset may be implemented is shown. A sub-image 1300 is shown, having a width 1320 and being made up of a number of pixels, including a pixel at location 1310. After the image or sub-image size is doubled to accommodate both the original colour image and depth image, the depth data inserted on one side of the new image or frame, and the colour data is inserted into the other side of the new image or frame, as shown in image 1140. Pixel 1310 is copied to a new position 1330, and a corresponding pixel is copied to position 1340. For example, where sub-image 1300 is a colour image, pixel 1330 stores colour information, while pixel 1340 stores the corresponding depth information. Pixel 1340 is offset from pixel 1330 by the fixed offset amount 1350. As the offset is equal to the image width in this example, the position of pixel 1340 is calculated by adding the horizontal position of pixel 1330 to the value of frame width 1320. Fixed offset 1350 do not change for any frame or image in the sequence. The positions of the pixels in the second sub-image, being the depth sub-image in this example, are calculated based on the horizontal position of the colour pixel plus the frame width 1320.

Figure 8:
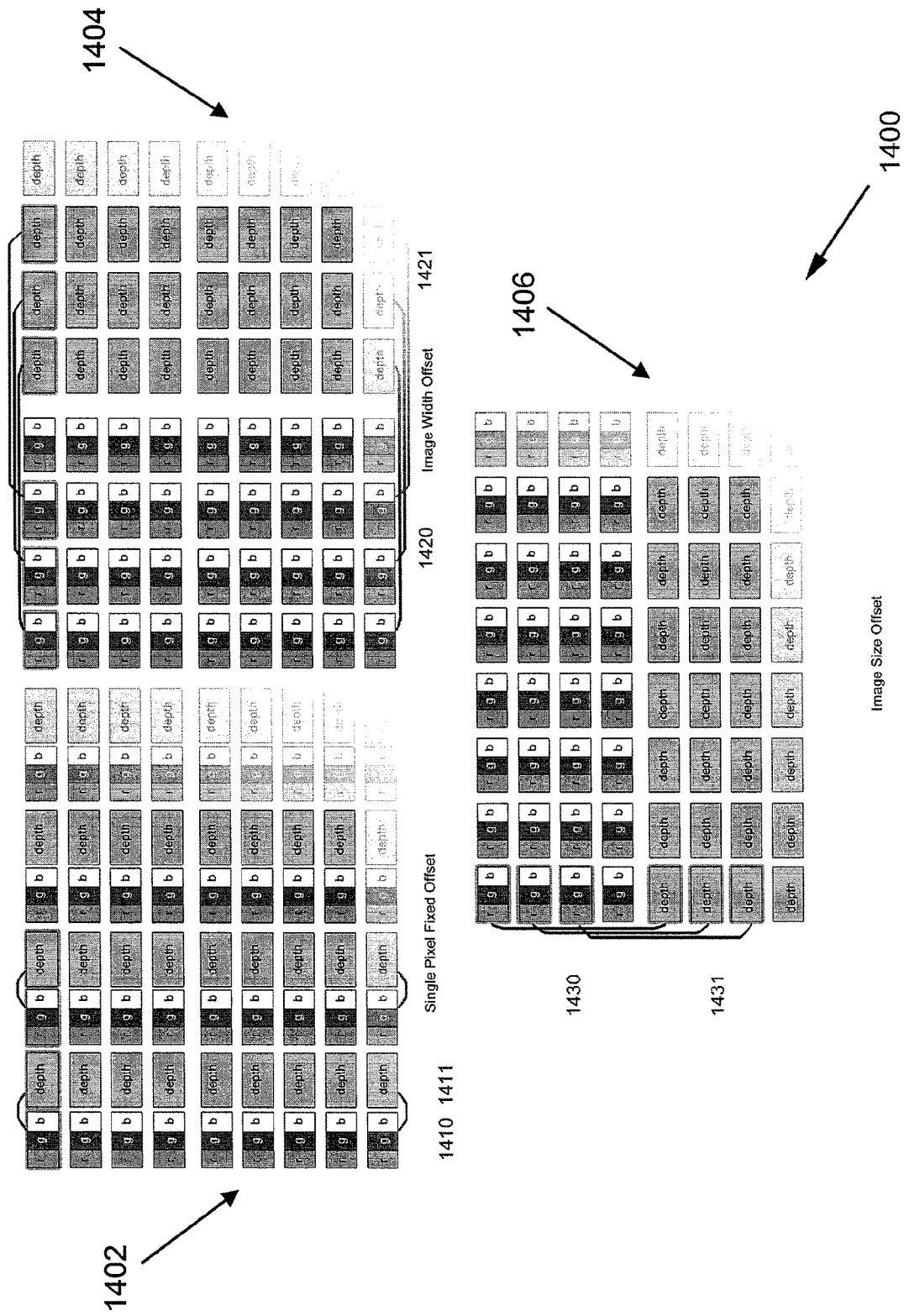
FIG. 8 shows with more clarity the offsetting and variations on how the offsetting might be arranged.

Referring generally to FIG. 8, a diagram 1400 is shown. In the first image 1402, colour pixels 1410 are directly adjacent to depth pixels 1411. This is an example of single pixel fixed offset. In the second image 1404, colour pixels 1420 are offset by the image width, which results in depth pixels 1421 being positioned together, rather than in a striped or interlaced arrangement. In image 1406, the vertical arrangement of colour pixels 1430 and depth pixels 1431 provides the same benefit (including resistance to block-compression errors and bleeding) as using a fixed width offset, but uses a vertical alignment, which may be preferred in certain instances. For example, in the case of some landscape oriented images, vertical arrangements result in a squarer image, having a width and height of a similar size, rather than producing a particularly wide image. Square images typically compress and store better both in containers and on graphics-hardware.

Figure 9:
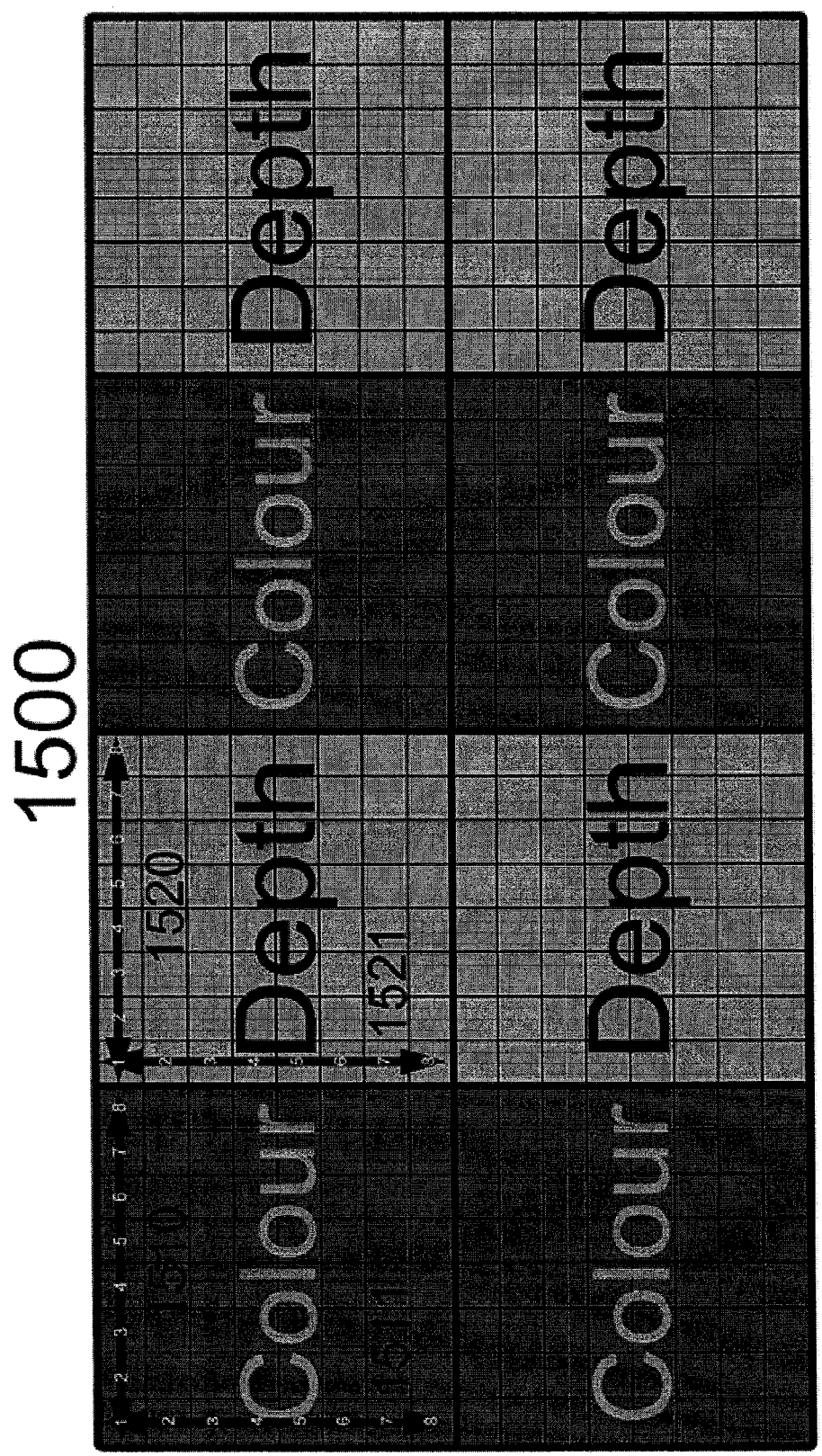
FIG. 9 illustrates a method that shows how offsetting may be applied to image blocks.

Referring generally to FIG. 9, an image 1500 is shown, illustrating an example arrangement in which colour and depth information can be arranged in regular sized blocks. Blocks are a set size in terms of width and length, or in the X and Y dimensions. In the illustrated example, the size of each colour block is a width 1510 of 8 pixels, and a height 1511 of 8 pixels. The size of each depth block is a width 1520 of 8 pixels and a height 1521 of 8 pixels. Arranging the colour and depth information in blocks as illustrated allows mitigation of the interlacing effect.

Figure 10:
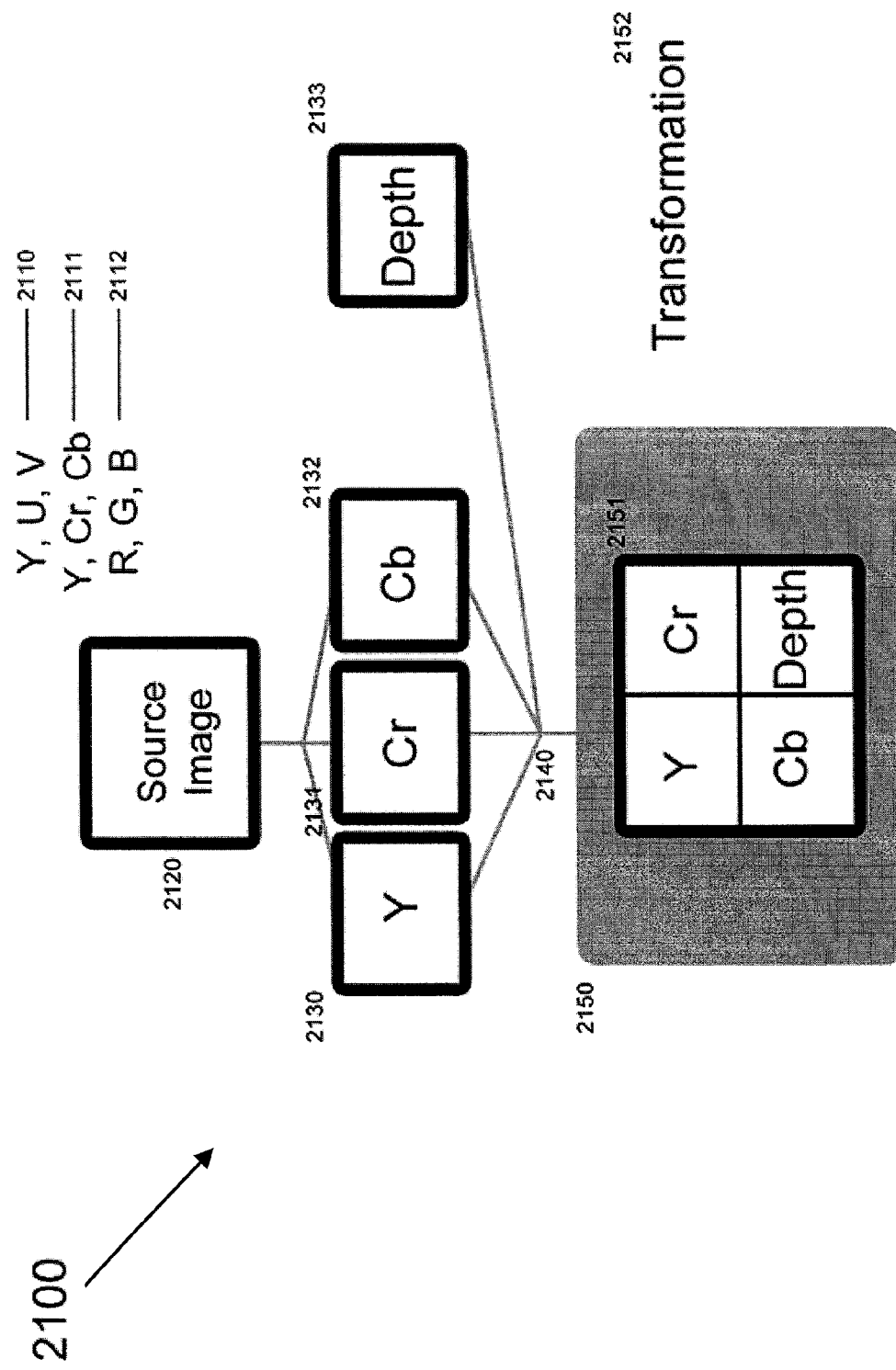
FIG. 10 is a block diagram of how an image might be processed from a traditional RGB colourspace to a colourspace that allows the depth to be added with no increase in frame size, yet no apparent loss in visual fidelity.

Referring generally to FIG. 10, a block diagram 2100 is shown, illustrating a source image 2120, which may be a still image or frame of a video or image sequence. Image 2120 is separated into three channels or components, which may be Y, U, V 2110, Y, CR, CB 2111 or R, G, B 2112 in some embodiments. In the illustrated embodiment, a Y (luminance channel) 2130, Chroma Red channel 2131 and Chroma Blue channel 2132 are depicted. Each channel is monochromatic, operating in a custom colourspace, being a colourspace that is not inherently configured to support that channel. The depth image 2133 that corresponds to the source image 2120 is prepared at the same time. At 2140, source image 2120 and depth image 2133 are combined into a new container 2150 which is scaled up to twice the size of the original source image 2120. The transformation 2152 places the four components in a grid 2151, with the Y 2130, the Cr 2131, the Cb 2132 and the depth 2133 arranged in the new frame size.

Figure 11:
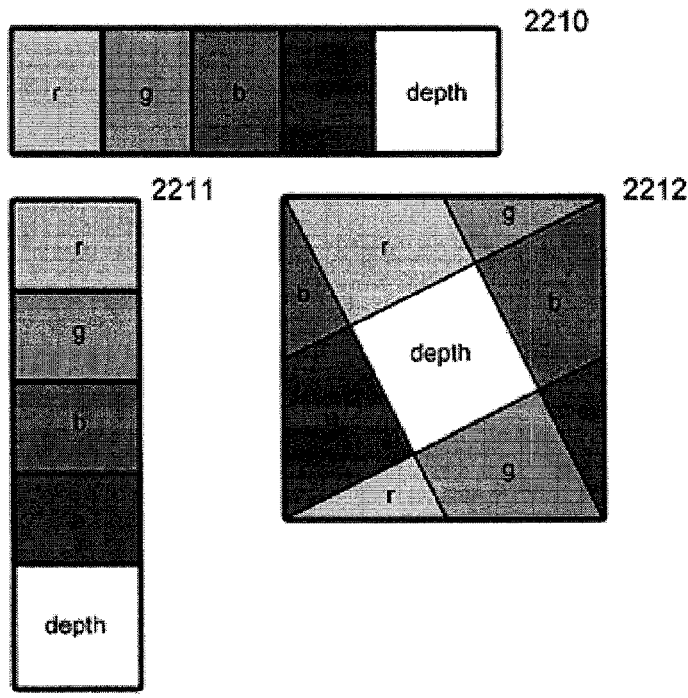
FIG. 11 shows various standard packing models.
Figure 11:
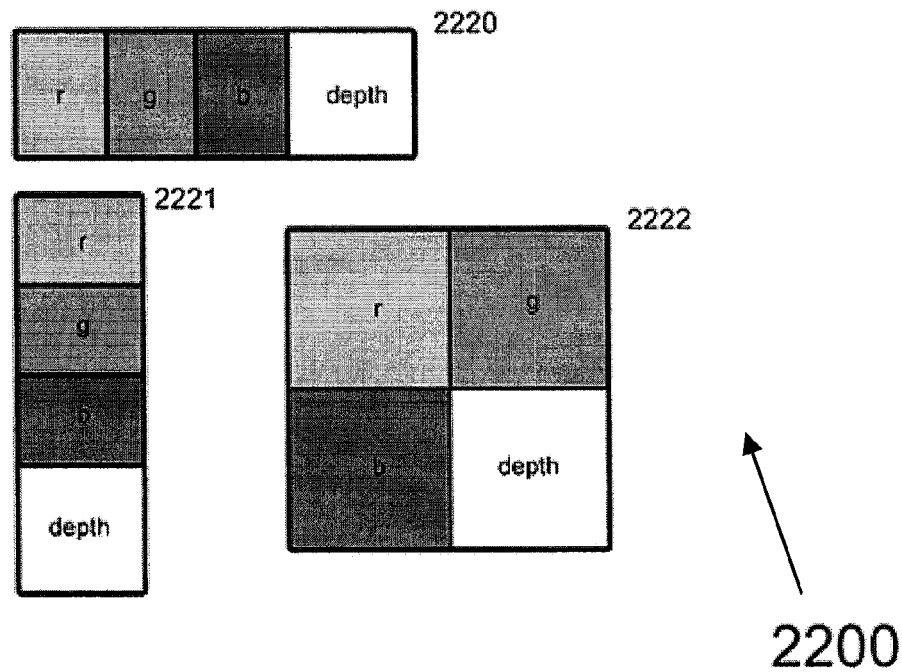

Referring generally to FIG. 11, diagram 2200 illustrates a number of ways in which four and five component layouts can be arranged in various container shapes for a variety of applications, depending on desired container dimensions and the number of required channels.

For five component images, containing (for example) red, green, blue, exponent and depth channels, in some embodiments, a horizontal layout may be used, where data from each channel is arranged side by side as illustrated in image 2210. In some embodiments, a vertical layout may be used, where the data from each channel is arranged one on top of the other as illustrated in image 2211. In some embodiments, a five component image packing technique may be used, as shown in image 2212. Rotated arrangements like that shown in image 2212 are particularly useful for utilizing hardware texture-wrapping to attempt to keep container dimensions roughly square. In image 2212, a square is divided into 9 segments. The segments are separated by lines drawn from each vertex of the square, to the midpoint of the second side of the square counting counter-clockwise from the vertex. The central segment forms a square, identified as "depth" in image 2212. By combining the segment touching any apex of the central square with the segment touching the second wall of the depth square, counting clockwise from the apex, produces a square of equal size to the central square. For example, the top left "b" segment in image 2212 can be combined with the right hand "b" segment to form a square. The same is true of the segments named "r", "g" and "e". This allows five channels of equal size to be combined to form a square-shaped block of image data. Other known packing schemes may be used for images comprising more than 5 or less than 4 components, in order to retain a square or close to square container shape.

For four component layouts containing (for example) red, green, blue and depth, in some embodiments a horizontal layout may be used, where data from each channel is arranged side by side as illustrated in image 2220. In some embodiments, a vertical layout may be used, where the data from each channel is arranged one on top of the other as illustrated in image 2221. In some embodiments, a square grid may be used, as illustrated in image 2222. Grid arrangements like that shown in image 2222 are particularly useful for utilizing hardware texture-wrapping to attempt to keep container dimensions roughly square.

Figure 12:
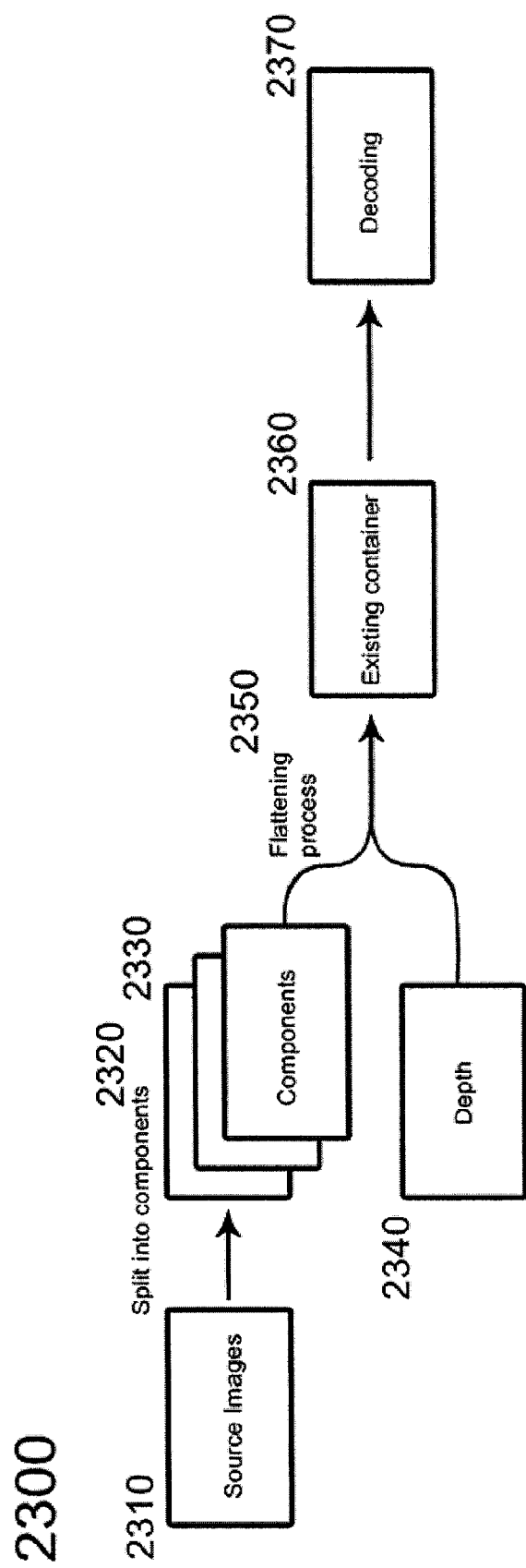
FIG. 12 is a flowchart that describes how an image might be split into components that use a different colourspace, and then combined with a depth image to produce a new image that can be read.

Referring generally to FIG. 12, a block diagram 2300 is shown. Block diagram 2300 shows a source image or frame 2310 split into components 2320. The components 2330 may be red, green and blue in some embodiments. In some other embodiments, they may be Y, Cr and Cb, or any other established set of components. These are then combined at 2350 with the depth image 2340 that matches the source image 2310 into an existing container format 2360. The container 2360 is then processed by processing device 0130 and decoded at step 2370.

Figure 13:
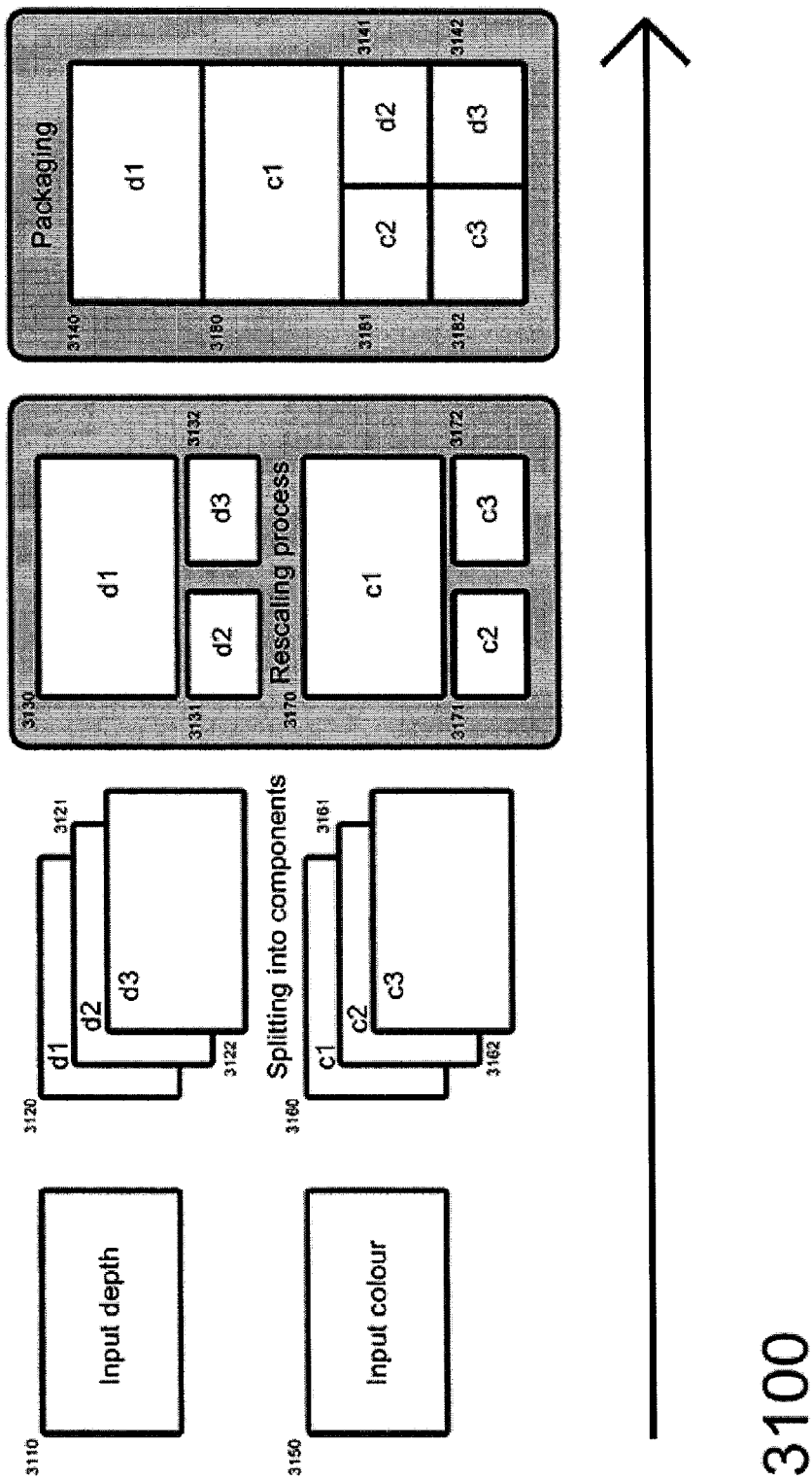
FIG. 13 is a block diagram that shows how colour and depth may be combined into a single container through splitting, rescaling the less-visually important components and then repacked.

Referring generally to FIG. 13, a block diagram 3100 is shown. Block diagram 3100 shows a source depth image 3110 and a source colour image 3150 being split into three components each, being d1, d2 and d3 for the depth image 3110, and c1, c2 and c3 for the colour image 3150. A depth image may be split into multiple depth components to allow a coarse-fine representation of the image, with different components storing data at different resolutions. For example, a high resolution component maybe used to store mid-ground data, with lower resolution components storing depth data for the foreground and background. This allows for a higher level of image accuracy in the areas of the image that are likely to contain more detail, while saving space by being less accurate in areas of the image that are considered to have less visual importance to a viewer. In the illustrated embodiment, component d1 3120 is treated as the luminance channel, while d2 3121 and d3 3122 are treated as the Cr and Cb channels. Similarly, in the illustrated embodiment the input colour image's 3150 three components are c1 3160 luminance, c2 3161 Chroma Red and c3 3162 Chroma Blue. Each component is resealed to reflect their contributions to the final colour makeup. The component d1 3130 is scaled much larger than the d2 3131 or the d3 3132, while the c1 3170 is scaled much larger than the c2 3171 and the c3 3172. Finally these are packed into the final container frame size, with d1 3140 and c1 3180 taking up the most space, and c2 3181, c3 3182, d2 3141 and d3 3142 being scaled to one quarter the size of c1. Using this arrangement, all of the components can be positioned into the same space.

Figure 14:
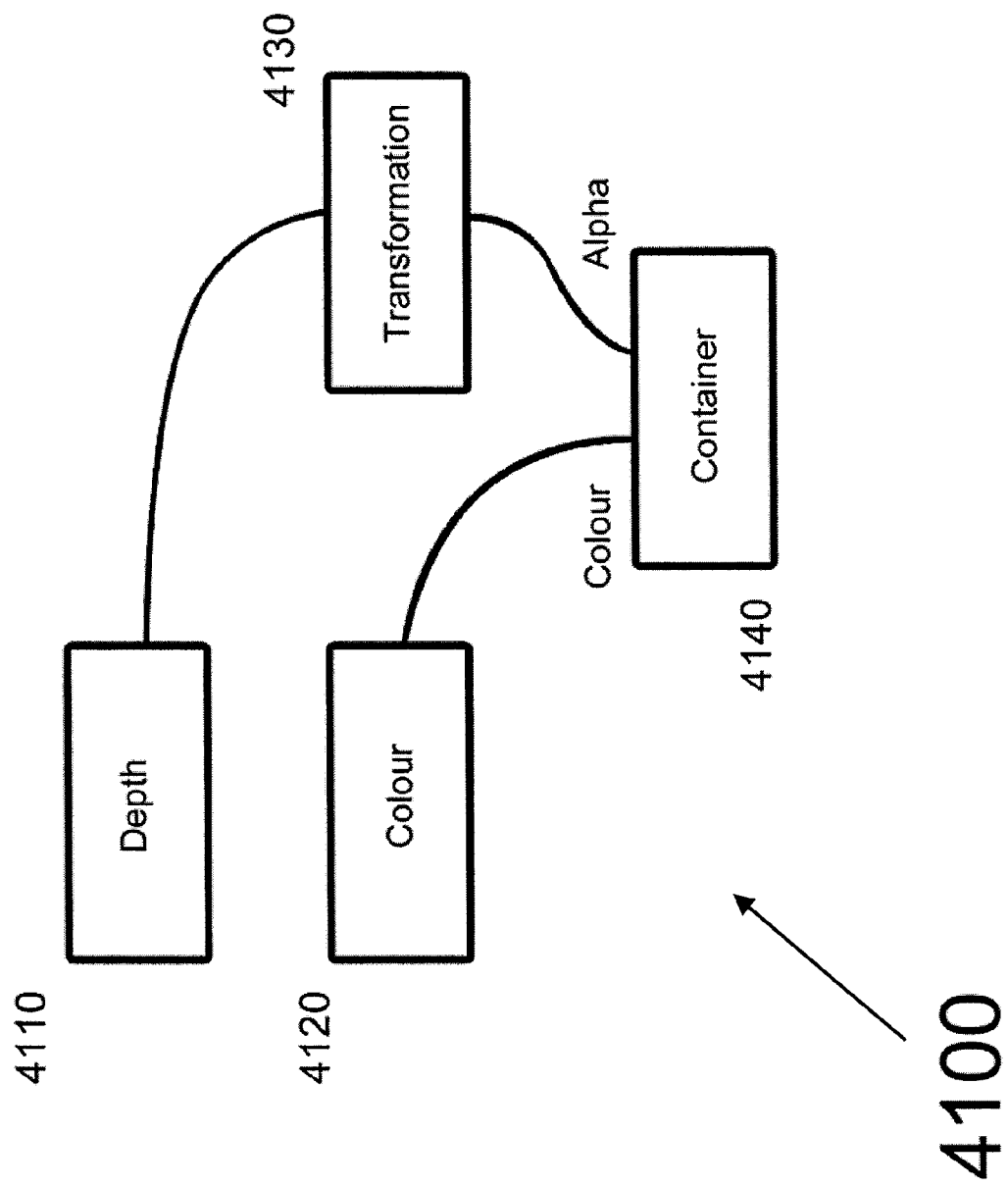
FIG. 14 is a flowchart that shows how depth information might be slotted into a container that is already designed to contain non-colour data, like an alpha channel.

Referring generally to FIG. 14, a block diagram 4100 is shown illustrating how a depth image 4110 and a colour image 4120 may be packaged into a new container 4140, where the container is configured to support an auxiliary channel. In the illustrated embodiment, container 4140 is able to contain depth 4110 as a virtual, flattened channel. Before depth 4110 is passed into container 4140, it is transformed by transformation process 4130 to prepare it for insertion into the auxiliary or alpha channel of container 4140. Transformation process 4130 may differ depending on the application. For example, transformation process 4130 may include applying a coarse-fine compression, as described above with reference to FIG. 13. In some embodiments, transformation process 4130 may include a transform, rotate, scale (TRS) matrix operation to convert between input and destination coordinates. A further example of transformation process is described below with reference to FIG. 15, where transformation process 4130 may be transformation operation 4200.

The auxiliary channel accuracy is typically the same or less than the accuracy of the colour channels, which may be an insufficient accuracy for the purpose of storing depth data. To address this, transformation process 4130 may include the step of packing data into the auxiliary channel using the transformative packing approach as described above with reference to FIG. 13. This allows for high fidelity mixed resolution packing of depth data.

Figure 15:
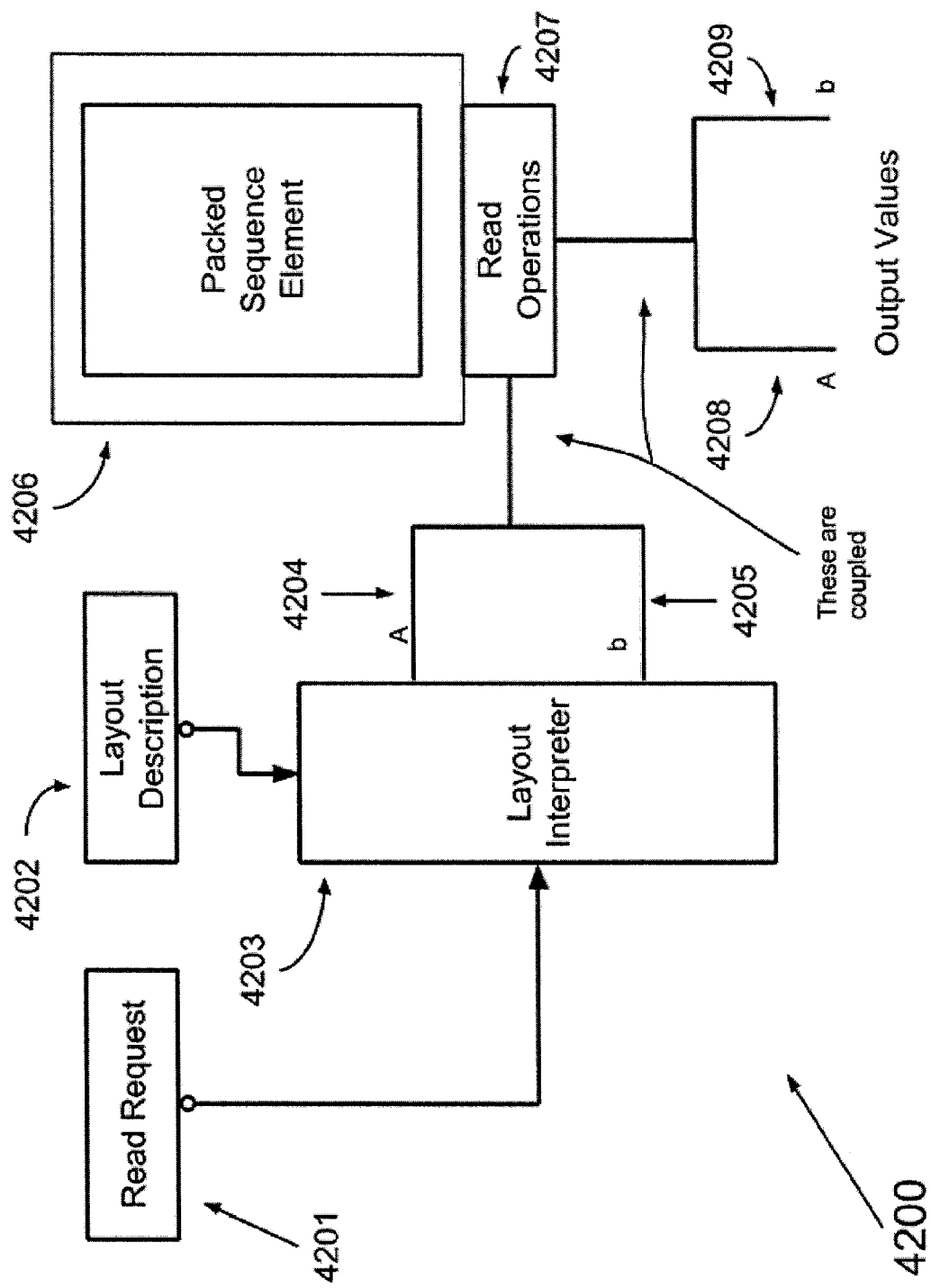
FIG. 15 is a block diagram showing a transformation process performed on an image.

Referring generally to FIG. 15, a block diagram of transformation operation 4200 is shown. A transformation operation 4200 is initiated when read request 4201 requests a read of packed image 4206. Read request 4201 is interpreted by layout interpreter 4203, using layout description 4202 as the index. Read request A 4204 contains location index information as interpreted by layout interpreter 4203. Read request A 4204 is passed to read operation 4207, which reads the appropriate location of packed sequence element 4206. Having retrieved the correct sample from packed sequence element 4206, output value A 4208 is output. Read request b 4205 contains location index information as interpreted by layout interpreter 4203. Read request B 4205 is passed to read operation 4207, which reads the appropriate location of packed sequence element 4206. Having retrieved the correct sample from packed sequence element 4206, output value b 4209 is output. This process repeats until the entire packed sequence element 4206 is read and output.

Although selected aspects have been illustrated and described in detail, it will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A machine-implemented method of packing volumetric image data executed by at least one processing device, the method comprising:
    receiving a first image containing X by Y pixels of one of colour data and depth data and a second image containing X by Y pixels of the other of colour and depth data, wherein the first image is temporally correlated with the second image;
    adjusting the pixel values of the first and second images to produce spatially correlated first and second images; wherein the spatially correlated images appear to be captured from the same perspective;
    determining a first block size;
    writing to memory a first block of image data from the first image, the first block having the first block size;
    determining a second block size;
    writing to memory a second block of image data from the second image, the second block having the second block size; and
    repeating the steps of determining a first block size, writing to memory a first block of image data, determining a second block size and writing to memory a second block of image data until all of the received data has been written to memory;
    wherein each pixel of image data from the first image is written to memory at a fixed offset from a corresponding pixel of image data from the second image.

2. The method of claim 1, further comprising setting bounds of an image container based on a size of the first image and a size of the second image, and packing the volumetric image into the image container.

3. The method of claim 1, wherein a data format of the image container is configured for colour data storage.

4. The method of claim 1, wherein the image container is configured to store colour data and auxiliary data, and wherein the depth data is stored within one or more auxiliary components of the container.

5. The method of claim 1, wherein at least one of the first block size and the second block size are determined based on at least one of: metadata associated with the first image or the second image; and data stored in a file, the file being associated with the first image or the second image.

6. Then method of claim 1, wherein the first block size and the second block size are each smaller than X by Y.

7. The method of claim 1, wherein at least one of the first block size and the second block size are determined based on the size of the first image or the second image.

8. The method of claim 1, wherein one or more of the colour data and the depth data are split into one or more data components before being written to memory, and wherein the first block of data comprises one or more of the data components of one of the colour data and the depth data, and the second block comprises one or more of the data components of the other of the colour data and the depth data.

9. The method of claim 8, wherein the data components are packed into a grid configuration when being written to memory.

10. The method of claim 9, wherein the colour and depth data are split into five data components, and the data components are packed into a square configuration when being written to memory.

11. A non-transitory computer-readable medium storing executable program code that, when executed by a computing device or computing system, causes the computing device or computing system to perform the method of claim 1.

12. A system comprising:
    at least one processor; and
    memory;
    wherein the at least one processor has access to the memory and the computer-readable medium of claim 11.

13. A machine implemented method of unpacking volumetric image data executed by at least one processing device, the method comprising:
    determining a first block size;
    reading a first block of data from a first location in memory, the first block of data comprising one of colour data and depth data, and the first block having the first block size;
    determining a second block size;
    reading a second block of data from a second location in memory, the second block of data comprising the other of colour data and depth data, and the second block having the second block size; and
    repeating the steps of determining a first block size, reading a first block of data from a first location in memory, determining a second block size and reading a second block of data from a second location in memory until a first image containing X by Y pixels of colour data and a second image containing X by Y pixels of depth data have been read;
    wherein the colour data is spatially correlated to the depth data so that the first image and the second image appear to be captured from the same perspective; and
    wherein each pixel of colour data is read from a memory location at a fixed offset from a corresponding pixel of depth data.

14. The method of claim 13, wherein the first block of data and the second block of data are part of a volumetric image file, and wherein the first block of data is written to a first image file and the second block of data is written to a second image file.

15. The method of claim 14, further comprising setting bounds of a first image file size and a second image file size based on a size of the volumetric image file.

16. The method of claim 14, wherein at least one of the first block size and the second block size are determined based on at least one of metadata associated with the volumetric image file; data stored in a file, the file being associated with the volumetric image file; and the size of the volumetric image file.

17. The method of claim 14, wherein the first block size and the second block size are each smaller than half of the volumetric image size.

18. The method of claim 13, wherein the volumetric image data was packed according to a method comprising:
receiving a first image containing X by Y pixels of one of colour data and depth data and a second image containing X by Y pixels of the other of colour and depth data, wherein the first image is temporally correlated with the second image;
adjusting the pixel values of the first and second images to produce spatially correlated first and second images; wherein the spatially correlated images appear to be captured from the same perspective;
determining a first block size;
writing to memory a first block of image data from the first image, the first block having the first block size;
determining a second block size;
writing to memory a second block of image data from the second image, the second block having the second block size; and
repeating the steps of determining a first block size, writing to memory a first block of image data, determining a second block size and writing to memory a second block of image data until all of the received data has been written to memory;
wherein each pixel of image data from the first image is written to memory at a fixed offset from a corresponding pixel of image data from the second image.

* * * * *